United States Patent
Gareau et al.

(10) Patent No.: US 10,193,688 B2
(45) Date of Patent: Jan. 29, 2019

(54) FLEXIBLE ETHERNET ENCRYPTION SYSTEMS AND METHODS

(71) Applicant: Ciena Corporation, Hanover, MD (US)

(72) Inventors: Sebastien Gareau, Ottawa (CA);
Timothy L. Norman, Ottawa (CA);
Marc W. Leclair, Gatineau (CA);
Michael Watford, Ottawa (CA)

(73) Assignee: Ciena Corporation, Hanover, MD (US)

( * ) Notice: Subject to any disclaimer, the term of this patent is extended or adjusted under 35 U.S.C. 154(b) by 147 days.

(21) Appl. No.: 14/966,779

(22) Filed: Dec. 11, 2015

(65) Prior Publication Data

US 2017/0171163 A1 Jun. 15, 2017

(51) Int. Cl.
*H04L 9/08* (2006.01)
*H04L 29/06* (2006.01)

(52) U.S. Cl.
CPC ........ *H04L 9/0819* (2013.01); *H04L 63/0435* (2013.01); *H04L 63/061* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,848,533 B1 | 9/2014 | Stuart et al. | |
| 8,867,913 B2 | 10/2014 | Gareau et al. | |
| 2006/0126835 A1* | 6/2006 | Kim | H04L 9/0637 380/44 |
| 2006/0153239 A1* | 7/2006 | Julian | H04W 28/065 370/474 |
| 2011/0019681 A1 | 1/2011 | Gazier et al. | |
| 2011/0249687 A1* | 10/2011 | Diab | H04L 1/0002 370/474 |
| 2013/0039658 A1* | 2/2013 | Abbas | H04J 3/1652 398/52 |
| 2013/0266312 A1 | 10/2013 | Prakash et al. | |
| 2013/0308943 A1 | 11/2013 | Young et al. | |
| 2014/0331047 A1* | 11/2014 | Turk | H04L 41/0816 713/168 |
| 2015/0055664 A1 | 2/2015 | Kanonakis et al. | |

OTHER PUBLICATIONS

Zijian He, "Using Felxible Ethernet to Build a Flexible Network", Feb. 19, 2014, p. 872-875.*
Gustlin et al., "What is FlexEthernet?" Ethernet Technology Summit.

(Continued)

*Primary Examiner* — Joseph P Hirl
*Assistant Examiner* — Hassan Saadoun
(74) *Attorney, Agent, or Firm* — Clements Bernard Walker PLLC; Christopher L. Bernard; Lawrence A. Baratta, Jr.

(57) ABSTRACT

Systems and methods for Physical Coding Sublayer (PCS) encryption implemented by a first network element communicatively coupled to a second network element include utilizing an encryption messaging channel to establish an authenticated session and exchanging one or more encryption keys with a second network element; encrypting a signal, based on the one or more encryption keys; and transmitting the encrypted signal to the second network element.

17 Claims, 17 Drawing Sheets

(56) References Cited

OTHER PUBLICATIONS

Vusirikala, "FlexEthernet (FlexE) Use Cases," TEF: The Rate Debate.
Gustlin, "FlexEthernet—Protocols and Components," XILINX All Programmable.
"FlexE Implementation Agreement—Draft 1.1," Optical Internetworking Forum, Jul. 2015.
"Architecture of Ethernet layer networks," International Telecommunication Union, Feb. 2004.
B. Braden et al., RFC2309 "Recommendations on Queue Management and Congestion Avoidance in the Internet" Apr. 1998.
Walker et al., ITU Study Group 15—Contribution 110, OTN Sec : Security for OTN beyond 100 Gbit/s, Jul. 2013.
Stephen J. Trowbridge, Alcatel-Lucent USA, Mapping, of Flex Ethernet Clients over OTN, International Telecommunication Union, COM 15-C 1213-E, Study Period 2013-2016, vol. 11/15, Jun. 2015, pp. 1-7.
Marteen Vissers, Huawei Technologies Co., Ltd., Considerations on the mapping of FlexE Client and Subrate signals into OTN, International Telecommunication Union, COM 15-C 1195-E, Study Period 2013-2016, vol. 11/15, Jun. 2015, pp. 1-13.
OIF Optical Internetworking Forum, IA OIF-MLG-02.0, Multi-Link Gearbox Implementation Agreement, Apr. 2013, pp. 1-40.
European Search Report Issued in European Application EP 16177286, dated Oct. 21, 2016.

* cited by examiner

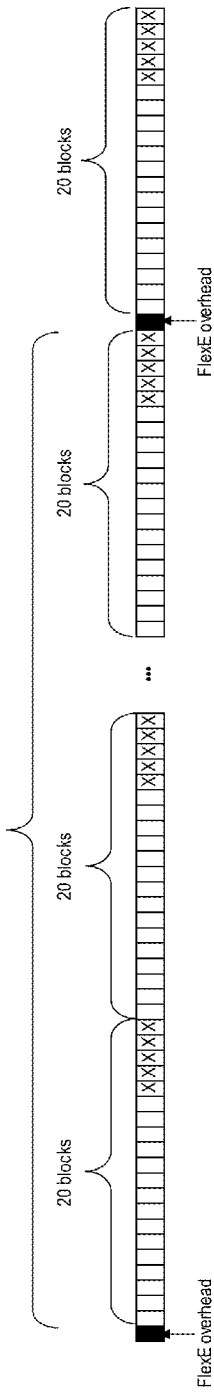
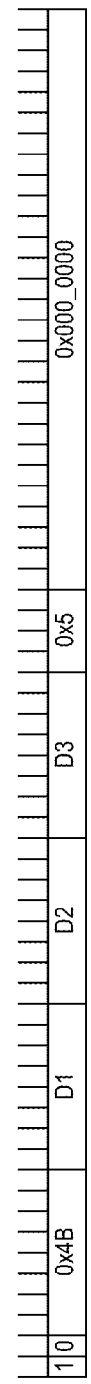
FIG. 8
FIG. 9

FIG. 12

Local Fault: | 0 | 1 | 0x4B | 0x00 | 0x00 | 0x01 | 0x0 | 0x000_0000 |

FIG. 13

Remote Fault: | 0 | 1 | 0x4B | 0x00 | 0x00 | 0x02 | 0x0 | 0x000_0000 |

| Input Data | Sync | Block Payload | | | | | | | |
|---|---|---|---|---|---|---|---|---|---|
| Bit Position / Data Block Format | 01 | | | | | | | | |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control Block Formats | | Block Type Field | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3C_4C_5C_6C_7$ | 10 | 0x4B | $D_1$ | $D_2$ | $D_3$ | $O_0$ | 0x000_0000 | | |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

FIG. 18

FLEXIBLE ETHERNET ENCRYPTION SYSTEMS AND METHODS

FIELD OF THE DISCLOSURE

The present disclosure generally relates to networking systems and methods. More particularly, the present disclosure relates to Flexible Ethernet (also referred to variously as Flex Ethernet or FlexE) encryption systems and methods.

BACKGROUND OF THE DISCLOSURE

Layer 1 protocols and technologies have evolved including Synchronous Optical Network (SONET)/Synchronous Digital Hierarchy (SDH) in the 1990s to Optical Transport Network (OTN) in the 2000s. SONET/SDH were synchronous protocols optimized for circuit switching and transmission. OTN evolved from SONET/SDH to provide transparency and support for Wavelength Division Multiplexing (WDM) as well as for optimized transmission of packet traffic. SONET, SDH, and OTN each have a rich suite of Operations, Administration, and Maintenance (OAM) functions and support for a wide range of services and applications. Conventionally, as OTN scales beyond 100G (B100G), there are emerging frameworks for Layer 1 functionality, namely Flexible OTN (FlexO or B100G) initiatives in the International Telecommunication Union (ITU) and Flex Ethernet in the Optical Internetworking Forum (OIF).

Traditionally, Ethernet rates were defined in steps of 10×, i.e., 10 Mb/s, 100 Mb/s, 1 Gb/s (GbE), etc. There is a wrinkle in this 10× progression where 40 Gb/s Ethernet (40 GbE) was defined. Today, there are various Ethernet rates defined, including rates in-between established rates. IEEE 802.3 standards group is discussing 2.5 Gb/s, 5 Gb/s, 25 Gb/s and other various odd rates. Specifically, different rates are established for different applications, such as wireless applications, data center group applications, data center interconnections, etc. There is an expectation that different Ethernet rates will continue as new high-volume applications require optimized solutions. Specifically, router/switch equipment and optical transmission equipment are evolving at different rates. There is a desire to support simple transport of n×Ethernet streams across a faster interface. IEEE historically defines Ethernet rates (Media Access Control (MAC) layer) with projects that also define the Physical (PHY)/Physical Medium Dependent (PMD) rates; the MAC rates and PMD rates are tied and defined together. To address evolution in Ethernet and dissociate the MAC/client rate to the PHY/PMD, Flexible Ethernet has been proposed. Note, as described herein, the terms Flexible Ethernet, Flex Ethernet, and FlexE can be used interchangeably.

In transport applications, FlexE can be used to match the flexibility of optical transmission equipment. Specifically, optical transmission equipment (e.g., Dense Wave Division Multiplexing (DWDM)) is evolving to support variable modulation formats, Forward Error Correction (FEC) schemes, baud rates, etc. DWDM equipment can support a variable line rate with the same hardware, relying on configuration and provisioning. FlexE is based on Ethernet constructs, e.g., 64b/66b encoding, recognizing the primary client being transported is Ethernet. Note, the current scope of FlexE, as described in Implementation Agreement IA #OIF-FLEXE-01.0 "Flex Ethernet Implementation Agreement—Draft 1.1" (July 2015), the contents of which are incorporated by reference, is limited to interfacing applications (e.g., bonding, subrating, and channelization). However, it may be advantageous to leverage Flexible Ethernet to augment or even replace OTN and/or FlexO in some transport and switching applications.

Various techniques exist for various network protocols for authentication and encryption for secure communication sessions. For example, Internet Protocol Security (IPsec) (RFC 430x) provides secure Internet Protocol (IP) communications by authenticating and encrypting each IP packet of a communication session. IEEE 802.1AE is the IEEE MAC Security standard (also known as MACsec) which defines connectionless data confidentiality and integrity for media access independent protocols. Security has also been extended in a proprietary manner, to Layer 1 protocols such as proprietary OTN ("OTNSec") or SONET bulk schemes. There are various disadvantages of IPSec, MACSec, and/or OTNSec. OTNSec is proprietary and, therefore, must be bookended and lacks interoperability. IPSec and MACSec cause packet inflation, i.e., an increase in packet size, so it decreases the effective throughput. These schemes also require complicated logic/circuitry with additional power and cost implications. Also, IPSec and MACSec only encrypt the payload, not the header. Further, with FlexE at Layer 1, there is an opportunity to provide bulk encryption at the FlexE layer, overcoming the aforementioned limitations as well as being used in combination with IPSec and/or MACSec.

BRIEF SUMMARY OF THE DISCLOSURE

In an exemplary embodiment, a method for Physical Coding Sublayer (PCS) encryption implemented by a first network element communicatively coupled to a second network element includes utilizing an encryption messaging channel to establish an authenticated session and exchanging one or more encryption keys with a second network element; encrypting a signal, based on the one or more encryption keys; and transmitting the encrypted signal to the second network element. The encryption can be applied to a 64b/66b bit stream associated with a FlexE signal at one or more of a FlexE client layer and a FlexE shim layer. The encryption messaging channel can be utilized for key exchange, authentication, and tags with the second network element. The signal can include a FlexE shim including a plurality of FlexE clients. The signal can include one of a FlexE client and a generic Ethernet PCS stream onto standard Ethernet PHY. The encryption messaging channel can utilize one or more of reserved bytes in FlexE overhead and a management channel. The encryption messaging channel can utilize a FlexE client or PCS stream with a designed Operational code. The encryption can be applied to a 64b/66b bit stream with one of (i) only data blocks encrypted and (ii) data blocks encrypted along with one or more control blocks including a start of packet and an end of packet. The encryption can utilize one or more of Advanced Encryption Standard (AES) and Galois/Counter Mode (GCM).

In another exemplary embodiment, an apparatus for Physical Coding Sublayer (PCS) encryption implemented at a first network element communicatively coupled to a second network element includes circuitry adapted to utilize an encryption messaging channel to establish an authenticated session and exchanging one or more encryption keys with a second network element; circuitry adapted to encrypt a signal, based on the one or more encryption keys; and circuitry adapted to transmit the encrypted signal to the second network element. The encryption can be applied to a 64b/66b bit stream associated with a FlexE signal at one or more of a FlexE client layer and a FlexE shim layer. The encryption messaging channel can be utilized for key exchange, authentication, and tags with the second network element. The signal can include a FlexE shim including a plurality of FlexE clients. The signal can include one of a FlexE client and a generic Ethernet PCS stream onto standard Ethernet PHY. The encryption messaging channel can utilize one or more of reserved bytes in FlexE overhead and a management channel. The encryption messaging channel can utilize a FlexE client or PCS stream with a designed Operational code. The encryption can be applied to a 64b/66b bit stream with one of (i) only data blocks encrypted and (ii) data blocks encrypted along with one or more control blocks including a start of packet and an end of packet. The encryption can utilize one or more of Advanced Encryption Standard (AES) and Galois/Counter Mode (GCM).

In a further exemplary embodiment, a network with Flexible Ethernet (FlexE) encryption includes a first network element; and a second network element communicatively coupled to the first network element; wherein the first network element is adapted to utilize an encryption messaging channel to establish an authenticated session and exchanging one or more encryption keys with a second network element, encrypt a signal, based on the one or more encryption keys, and transmit the encrypted signal to the second network element. The encryption can be applied to a 64b/66b bit stream associated with the FlexE signal at one or more of a FlexE client layer, a FlexE shim layer, and a generic Ethernet PCS stream onto standard Ethernet PHY.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is an example diagram of FlexE calendar slots where 25% of the calendar slots are unavailable;

FIG. 9 is a diagram of encoding of ordered set block for FlexE overhead;

FIG. 12 is a diagram of a standard Ethernet local fault ordered set;

FIG. 13 is a diagram of an Ethernet remote fault ordered set;

FIG. 18 is a table of 64b/66b block formats; and

DETAILED DESCRIPTION OF THE DISCLOSURE

Again, in various exemplary embodiments, the present disclosure relates to Flexible Ethernet (also referred to variously as Flex Ethernet or FlexE) bulk encryption systems and methods. The systems and methods apply bulk encryption concepts (Advanced Encryption Standard (AES), Galois/Counter Mode (GCM), etc.) to the FlexE layer and uses FlexE overhead for a messaging channel. The messaging channel provides messaging (key exchange and authentication) and tag (GCM) communications between both ends. The encryption can cover the 64b/66b bit stream at either the FlexE client layer (i.e., path) or FlexE shim layer (i.e., section/segment). The FlexE client can be mapped into a FlexE shim or can be used on a standard PHY and this encryption method can also be considered as a Physical Coding Sublayer (PCS) based encryption method. FlexE encryption is applied at Layer 1, and does not affect the packet rate and can be used with future FlexE interfaces, without requiring OTN wrapping. It is also lower complexity, resulting in lower logic, lower power and lower cost relative to other techniques (i.e., IPSec, MACSec, etc.). FlexE encryption can be applied at either the FlexE client (i.e., path layer) or the FlexE shim (i.e., section/segment) and can facilitate FlexE client circuit switching schemes.

Flexible Ethernet

FlexE provides a generic mechanism for supporting a variety of Ethernet Media Access Control (MAC) rates that may or may not correspond to any existing Ethernet PHY rate. This includes MAC rates that are both greater than (through bonding) and less than (through sub-rate and channelization) the Ethernet PHY (Physical Layer) rates used to carry FlexE. This can be viewed as a generalization of the Multi-Link Gearbox implementation agreements, removing the restrictions on the number of bonded PHYs (MLG2.0, for example, supports one or two 100GBASE-R PHYs) and the constraint that the client signals correspond to Ethernet rates (MLG2.0 supports only 10G and 40G clients). The Multi-Link Gearbox implementation agreements are described in IA # OIF-MLG-01.0 "Multi-link Gearbox Implementation Agreement" (May 2012) and IA # OIF-MLG-02.0 "Multi-link Gearbox Implementation Agreement" (April 2013), the contents of each are incorporated by reference.

Figure 1:
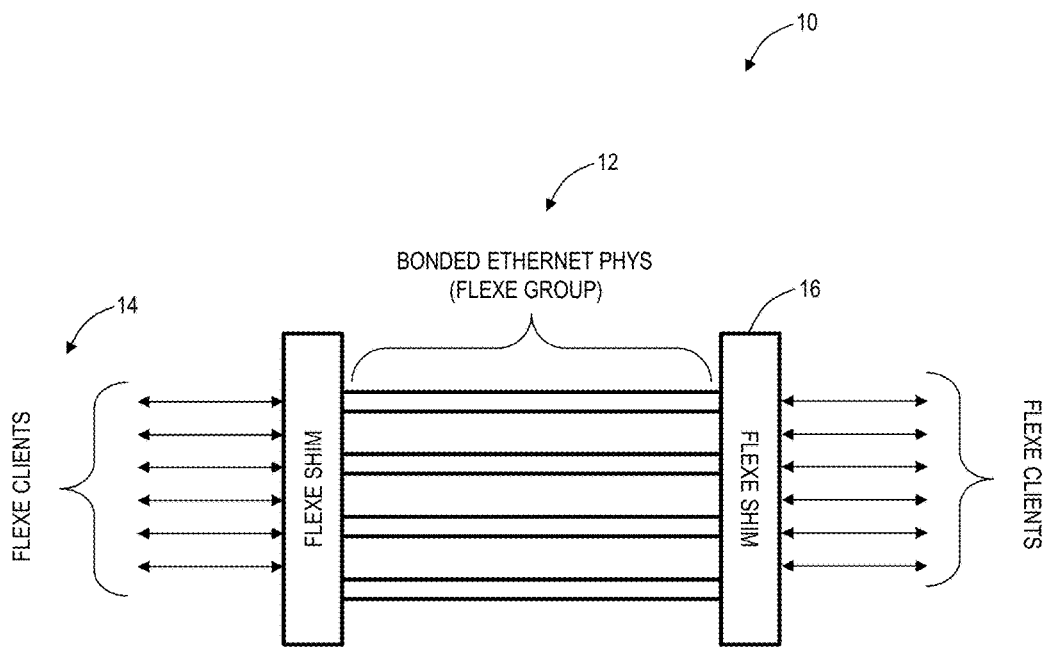
FIG. 1 is a diagram of a general structure of FlexE.

Referring to FIG. 1, in an exemplary embodiment, a diagram illustrates a general structure of FlexE 10. Again, conventionally, the general capabilities supported by the FlexE include (i) bonding of Ethernet PHYs, e.g., supporting a 200G MAC over two bonded 100GBASE-R PHYs, (ii) sub-rates of Ethernet PHYs, e.g., supporting a 50G MAC over a 100GBASE-R PHY, and (iii) channelization within a PHY or a group of bonded PHYs, e.g., support a 150G and two 25G MACs over two bonded 100GBASE-R PHYs. Note, combinations are also contemplated, for example, a sub-rate of a group of bonded PHYs, for example, a 250G MAC over three bonded 100GBASE-R PHYs.

The general structure of FlexE 10 includes a FlexE group 12, one or more FlexE clients 14, and a FlexE shim 16. The FlexE group 12 refers to a group including 1 to n bonded Ethernet PHYs. The FlexE group 12 can include one or more bonded 100GBASE-R PHYs as well as including other rates, including new, higher rates once those standards are complete. The one or more FlexE clients 14 are each an Ethernet flow based on a MAC data rate that may or may not correspond to any Ethernet PHY rate. The FlexE client 14 MAC rates supported by the current implementation agreement (IA #OIF-FLEXE-01.0) are 10, 40, and m×25 Gb/s. The FlexE shim 16 is the layer that maps or demaps the FlexE clients 14 carried over the FlexE group 12. Similar to the terminology of MLG, a FlexE mux refers to the transmit direction which maps the FlexE clients 14 over the FlexE group 12. The FlexE demux refers to the receive direction which demaps the FlexE clients 14 from the FlexE group 12.

Figure 2A:
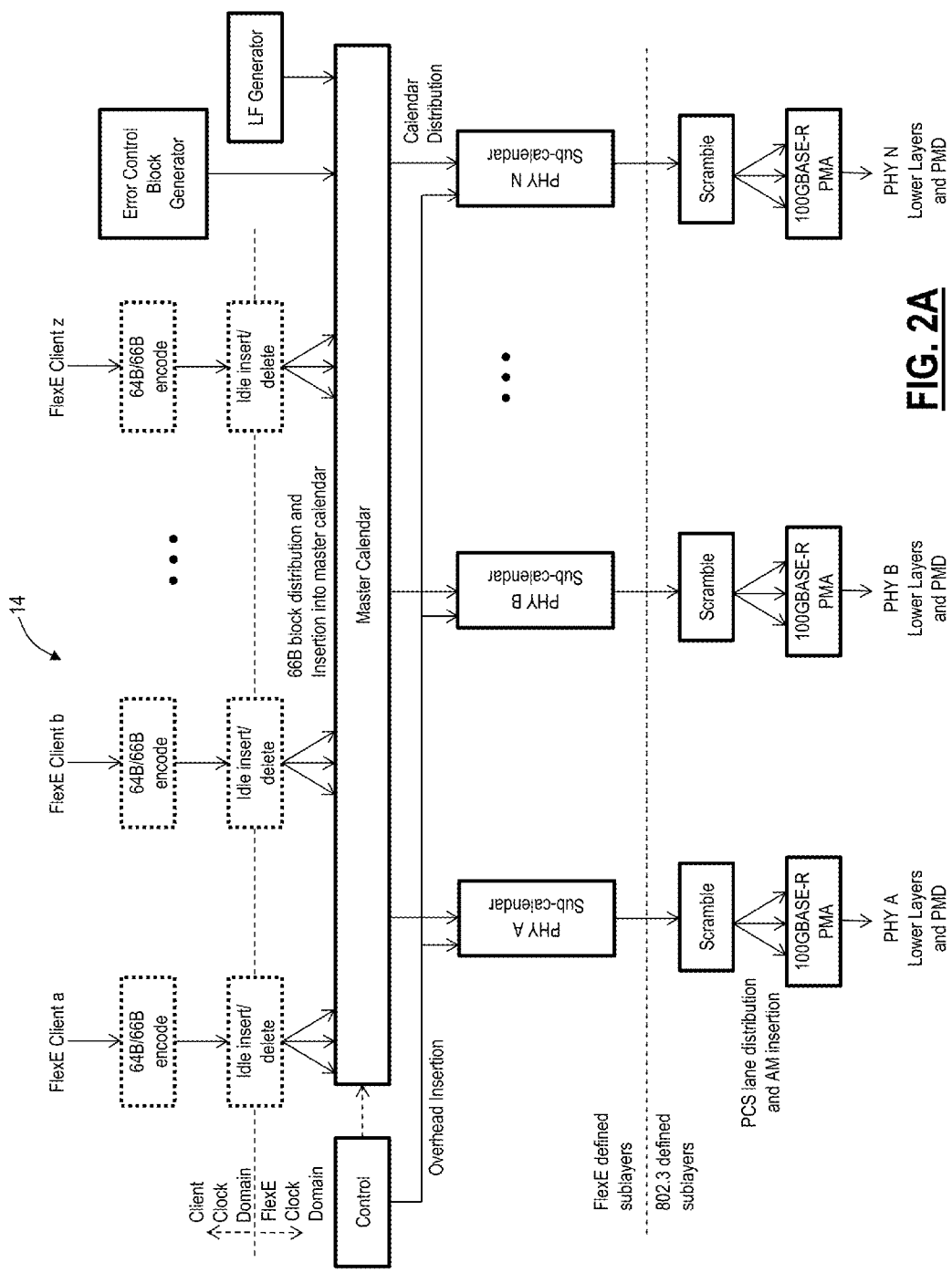
FIG. 2A is a block diagram of FlexE mux functions.
Figure 2B:
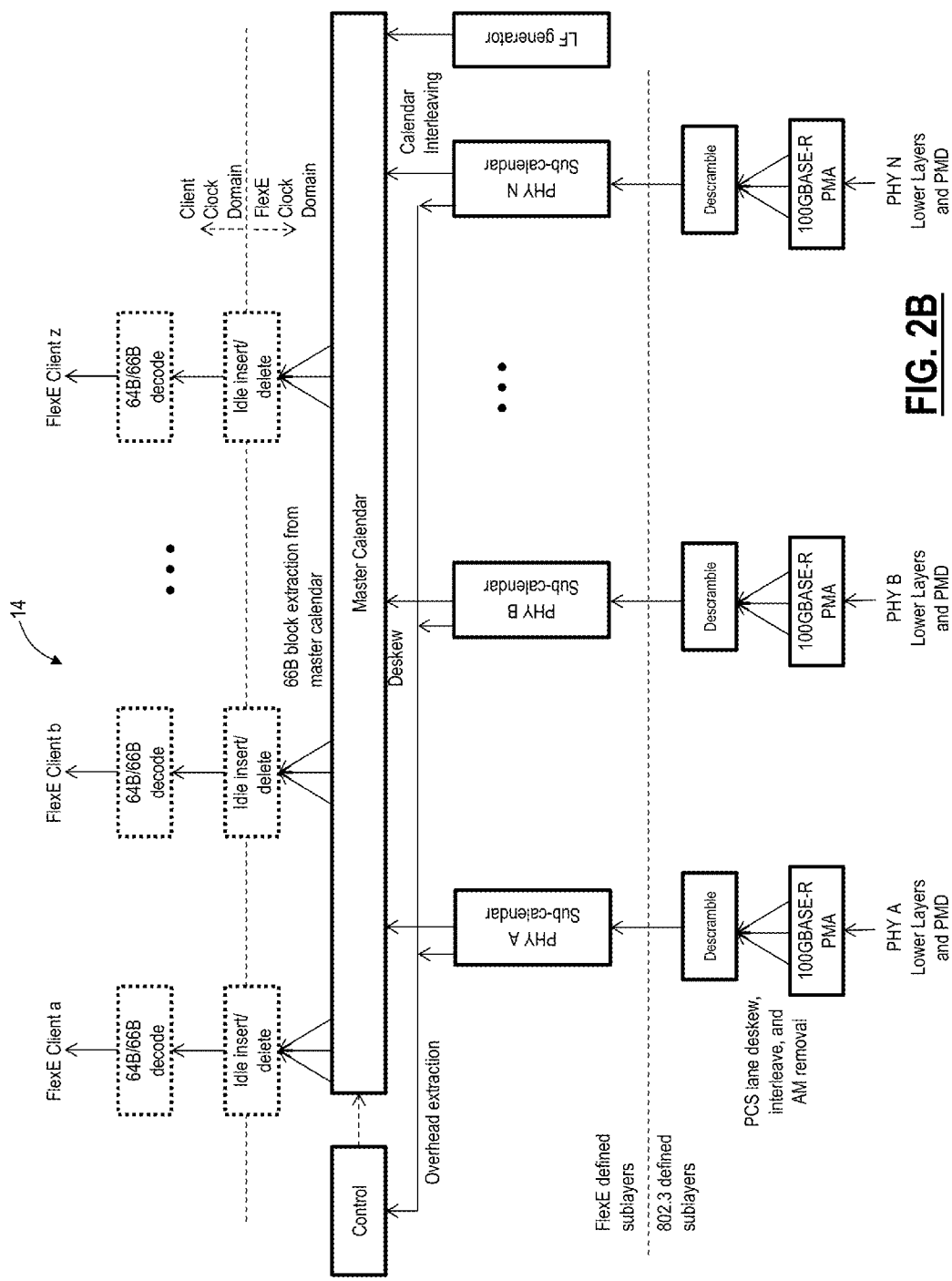
FIG. 2B is a block diagram of FlexE demux functions.

Referring to FIGS. 2A and 2B, in an exemplary embodiment, block diagrams illustrate FlexE mux functions (FIG. 2A) and FlexE demux functions (FIG. 2B). The FlexE shim 16 can be envisioned as being in the middle of the Physical Coding Sublayer (PCS) in the 100GBASE-R stack as illustrated in IEEE Std 802.3-2015 Figure 80-1. The Media Independent Interface (MII), Reconciliation Sublayer (RS), and MAC above the FlexE shim 16 are separate for each FlexE client 14 and operate at the FlexE client rate. The layers below the PCS (100GBASE-R Physical Medium Attachment (PMA), optional FEC, PMD) are used intact as specified for Ethernet. IEEE 802.3 is a working group, and a collection of IEEE standards produced by the working group defining the physical layer and data link layer's MAC of wired Ethernet.

FIG. 2A illustrates the functions of the FlexE mux (the FlexE shim 16 functions in the transmit direction). Where the 64b/66b encode and idle insert/delete functions are performed and whether these functions are part of the FlexE mux is application specific. What is presented for insertion into the slots of the FlexE master calendar is a stream of 64b/66b encoded blocks from each client encoded per IEEE Std 802.3-2015 Table 82-4 which has been rate-matched to other clients of the same FlexE shim 16. This stream of 66b blocks might be created directly at the required rate using back-pressure from a Network Processing Unit (NPU). It might come from a single-lane Ethernet PHY such as 10G or 25G, where the process of rate-matching involves both idle insertion/deletion, plus converting the rate-aligned stream from the 4-byte alignment of IEEE Std 802.3-2015 clause 49 to the 8-byte alignment of IEEE Std 802.3-2015 clause 82. Note that the IEEE 802.3 diagrammatic convention of showing idle insertion/deletion as though this were an operation that operates on a stream of 64b/66b blocks, even though strictly speaking this may require 64b/66b decoding and recoding, particularly in the case of converting between 4-byte alignment and 8-byte alignment. The stream of blocks may come from a multi-lane Ethernet PHY, where the lanes need to be deskewed and re-interleaved with alignment markers removed prior to performing idle insertion/deletion to rate match with other clients of the same FlexE shim 16. Or the stream may have come from another FlexE shim 16, for example, connected across an OTN network, where all that is required is to perform idle insertion/deletion to rate match with other clients of the same FlexE shim 16.

The 66b blocks from each FlexE client 14 are distributed sequentially into the master calendar in the order described herein. The 66b blocks from the master calendar are distributed to each PHY of the FlexE group 12 according to the ordering described herein. The FlexE overhead is inserted into the sub-calendar of each PHY. The stream of 66b blocks of each PHY is distributed to the PCS lanes of that PHY with the insertion of alignment markers, and this is presented at the PMA service interface in the 100GBASE-R stack. Lower layers and interfaces of the 100GBASE-R Ethernet PHY (e.g., CAUI, FEC, PMA, PMD) are used as specified in IEEE Std 802.3-2015. Error Control blocks are generated for insertion into calendar slots that are unused or unavailable. LF (Local Fault) blocks are generated for insertion into the calendar slots of any failed FlexE client.

FIG. 2B illustrates the functions of the FlexE demux (the FlexE shim 16 in the receive direction). The layers of each 100GBASE_R PHYs below the PCS are used exactly as specified in IEEE Std 802.3-2012. The PCS lanes are recovered, deskewed, reinterleaved, and the alignment markers are removed. The aggregate stream is descrambled. The calendar slots of the each PHY are logically interleaved in the order specified herein. The FlexE overhead is recovered from each PHY. In the case that any PHY of the FlexE group 12 has failed (PCS_Status=FALSE) or overhead lock or calendar lock has not been achieved on the overhead of any of the PHYs, LF is generated to be demapped from the master calendar for each FlexE PHY. The 66b blocks are extracted from the master calendar positions assigned to each FlexE client in the order described herein.

Where the Idle Insertion/Deletion, 66B Decoding functions are performed and whether they are inside or outside the FlexE is application specific. The 66b blocks could be delivered directly to an NPU. If delivered to a single-lane PHY, idle insertion/deletion may be used to increase the rate to the PHY rate, realigning to 4-byte boundaries in the process (for 10G or 25G) and recoding 64b/66b according to clause 49. For a multi-lane PHY, idle insertion/deletion is used to increase the rate to the PHY rate less the space needed for alignment markers, the blocks are distributed to PCS lanes with AM insertion. For a FlexE client mapped over OTN, idle insertion/deletion may be used to adjust the rate as required for the OTN mapping.

FlexE Applications

FlexE can support a variety of applications. A non-exhaustive list includes:
Router to Transport Connection.
Intra-Data Center "Fat Pipe" application: bonded PHYs for flows exceeding the PHY rate, or carrying traffic that doesn't distribute efficiently with LAG.
Generalized MLG for port expansion applications, e.g., an n×100G PHY as an umbilicus to a satellite shelf of lower rate ports.

Figure 3:
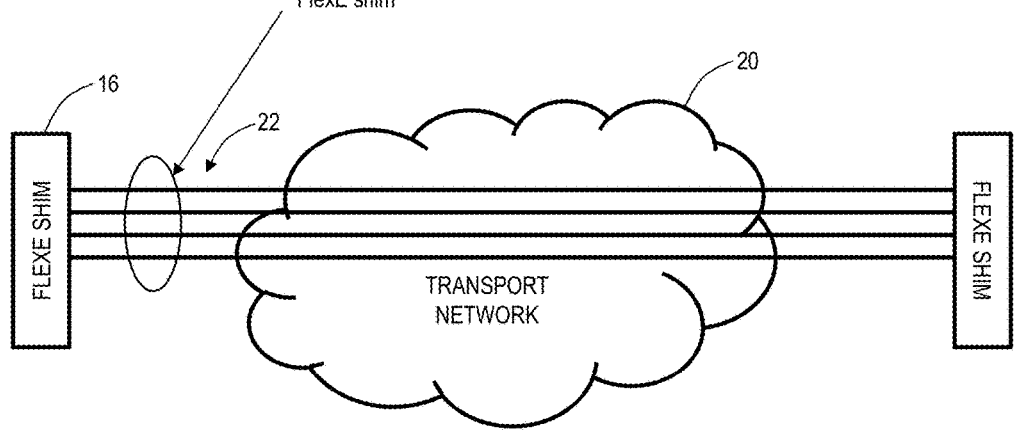
FIG. 3 is a diagram of a transport network aware or unaware of a router to transport FlexE connection.

Referring to FIG. 3, in an exemplary embodiment, a network diagram illustrates a transport network 20 unaware of a router to transport FlexE connection. In FIG. 3, the FlexE shim 16, e.g., in a router or switch, maps the FlexE client(s) 14 over a group of bonded Ethernet PHYs 22. Each of the Ethernet PHYs 22 is carried independently over the transport network 20 using a PCS codeword transparent mapping (e.g., the mapping of 100GBASE-R into Optical channel Path Unit 4 (OPU4) as described in ITU-T Recommendation G.709 clause 17.7.5). The Ethernet PHYs 22 are intended to be carried over the same fiber route. All of the PHYs 22 of the FlexE group 12 need to be interconnected between the same two FlexE shims 16. In this case, the FlexE shim 16 will need to tolerate and accommodate considerably more skew than if the FlexE shims 16 were only separated by an Ethernet link distance of 40 km or less, as the transport network 20 could carry the signal over thousands of kilometers. For the case illustrated in FIG. 3, it is the PHYs 22 of the FlexE group 12 which are carried over the transport network 20. Note, in FIG. 3, the transport network 20 is unaware of FlexE 10.

Figure 4:
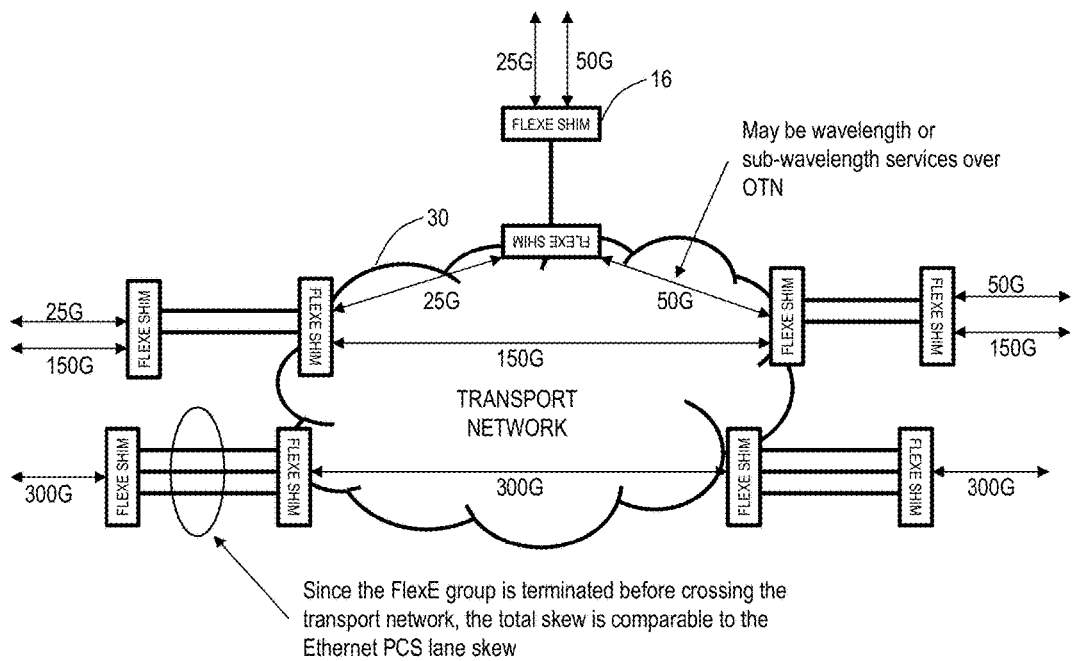
FIG. 4 is a network diagram of a transport network with FlexE termination.

Referring to FIG. 4, in an exemplary embodiment, a network diagram illustrates a transport network 30 aware of FlexE. In FIG. 4, the distance between any pair of FlexE shims 16 is limited to the Ethernet link distance (about 40 km maximum), so the amount of skew that needs to be tolerated and compensated is considerably less. The other important distinction here is that it is the FlexE clients 14 rather than the PHYs 22 of the FlexE group 12 which are carried over the transport network 30. The FlexE client 14 could be constructed to be the complete size of the payload that can be carried over a single wavelength (e.g., construct 200G to fill a Dual Polarization (DP) 16-Quadrature Amplitude Modulation (16QAM) wavelength with the bonding of two 100GBASE-R PHYs), or could be a smaller client which is multiplexed and switched at a sub-wavelength level, using the mapping described in ITU-T Recommendation G.709 clause 17.9 to carry the FlexE client signal over an Optical channel Data Unit flex (ODUflex) Constant Bit Rate (CBR).

Figure 5:
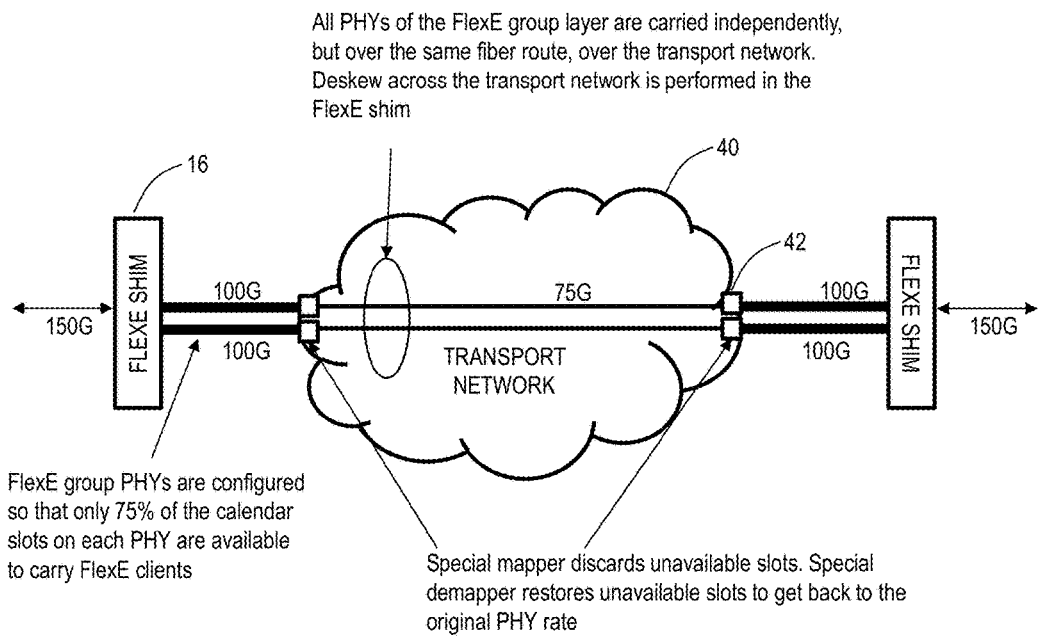
FIG. 5 is a network diagram of a transport network with FlexE aware partial-rate transport of Ethernet PHYs of a FlexE group.

Referring to FIG. 5, in an exemplary embodiment, a network diagram illustrates a transport network 40 of an example of partial-rate transport of Ethernet PHYs 22 of a FlexE group 12. Here, the Ethernet PHY rate may be greater than the wavelength rate, and there is a reason (for example, wavelengths terminated on different line cards) that it is not desirable to terminate the FlexE shim 16 in transport equipment 42. The example illustrated here is a 150G FlexE client carried over two 75G wavelengths, but one can imagine a possible future 200 GbE rate where one would want to carry a 300G FlexE client over two bonded 200 GbE and be able to carry the two partially-filled Ethernet PHYs over 150G wavelengths.

FlexE Group

The FlexE group 12 includes from 1 to n 100GBASE-R Ethernet PHYs 22. Each PHY can be identified by a number in the range [1-254]. The values of 0 and 255 are reserved. A PHY number may correspond to the physical port ordering on equipment, but the FlexE shim 16 at each end of the group must identify each PHY in the group 12 using the same PHY number. PHY numbers do not need to be contiguous: even if a FlexE group 12 is composed of initially contiguous PHY numbers, this may not be preserved as PHYs are added to or removed from the group 12.

Each of these PHYs 22 uses the bulk of the PCS functions described in IEEE Std 802.3-2015 clause 82 including PCS lane distribution, lane marker insertion, alignment, and deskew. All the PHYs 22 of the FlexE group 12 must use the same physical layer clock. Each PHY 22 of the FlexE group 12 is able to deliver a logically serial stream of 64b/66b encoded blocks from the FlexE mux to the FlexE demux at a data rate of:

$$103.125 \text{ Gb/s} \times \frac{16383}{16384} \pm 100 \text{ ppm}$$

FlexE supports a value of n (number of PHYs 22 in the FlexE group 12) up to 254, although practical implementations are likely limited to the range of 4-8 PHYs 22. The fraction applied to the base rate reflects the fact that 1/16K of the space of the interface is occupied by PCS lane alignment markers which are not space available to carry the FlexE payload. The FlexE payload carried over each PHY 22 of the FlexE group 12 has the format of a logically serial stream of (mostly) legal 64b/66b blocks with the format described in IEEE Std 802.3-2015 FIG. 82-4, although the blocks do not appear in a sequence that makes sense to interpret as an Ethernet interface. The actual PHYs 22 of the FlexE group 12 may transcode these blocks to 256b/257b format according to IEEE Std 802.3-2015 clause 91.5.2.5 according to the PHY type, but they are trans-decoded back to 64b/66b blocks prior to delivery to the FlexE demux.

FlexE Client

Each FlexE client 14 is a logically serial stream of 64b/66b blocks representing an Ethernet MAC layer. The MAC layer of a FlexE client 14 may operate at a rate of 10, 40, or n 25 Gb/s. The 64b/66b encoding is according to IEEE Std 802.3-2015 Figure 82-4. For certain cases where the FlexE client 14 originates from an Ethernet PHY, this may require conversion from the 4-byte alignment of start-of-packet for a PHY which uses the clause-49 PCS to the 8-byte alignment of Figure 82-4 as part of the idle insertion/deletion process.

In the case where the FlexE client 14 comes from an Ethernet PHY which uses PCS lane alignment markers (e.g., 40GBASE-R), the lanes must be deskewed, re-interleaved and serialized, removing the alignment markers to produce the 64b/66b stream which is treated as a FlexE client 14. All FlexE clients 14 transmitted over the same FlexE group 12 must be aligned to a common clock. This is accomplished using idle insertion/deletion as described in IEEE Std 802.3-2015 clause 82.2.3.6. In addition, the bit-rate of each FlexE client 14 is reduced slightly from nominal as part of this process to allow room for insertion of FlexE overhead and the PCS lane alignment markers of the FlexE group 12. So the 64b/66b encoded format of a FlexE client 14 operates at a data rate of:

$$\text{FlexE Client MAC rate} \times \frac{66}{64} \times \frac{16383}{16384} \times \frac{20460}{20461} \pm 100 \text{ ppm}$$

This is a rate reduction slightly under 0.011%, which is well within what can be accomplished with idle insertion/deletion without packet loss. Note that this does not actually correspond to any clock that needs to be generated in an implementation, as the idle insertion-deletion process will simply operate by filling the allocated block positions in the FlexE group 12 from a FlexE client 14 First-In First-Out (FIFO) with its own deficit idle counter and inserting or deleting idles in the process of filling the block positions in the FlexE group 12 according to a FlexE calendar.

FlexE Calendar

The FlexE operates using a calendar which assigns 66b block positions on each PHY 22 of the FlexE group 12 to each of the FlexE clients 14. The calendar has a granularity of 5G and has a length of 20 slots per 100G of FlexE group 12 capacity. Two calendars are supported: an "A" and a "B" calendar. At any given time, one of the calendars is used for mapping the FlexE clients 14 into the FlexE group 12 and demapping the FlexE clients 14 from the FlexE group 12. The two calendars are provided to facilitate reconfiguration.

Figure 6:
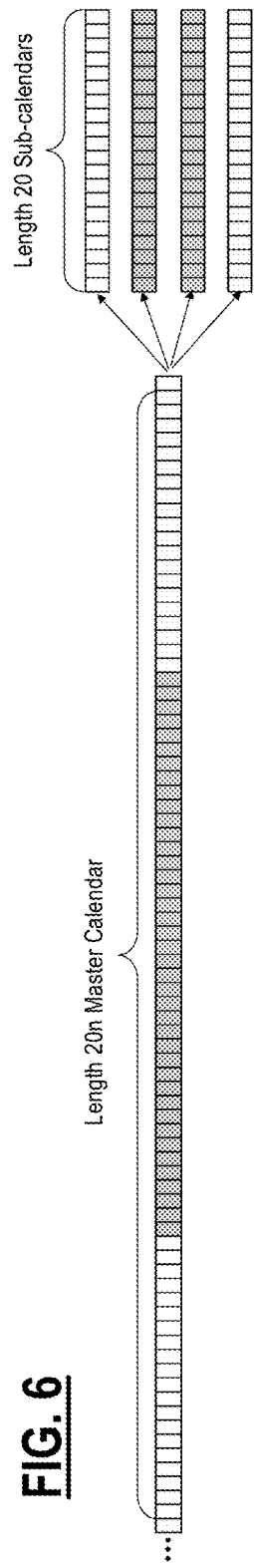
FIG. 6 is a diagram of FlexE calendar distribution.

For a FlexE group 12 including n bonded 100GBASE-R PHYs, the logical length of the master calendar is 20n. The blocks as allocated per the master calendar are distributed to n sub-calendars of length 20 on each of the PHYs of the FlexE group as shown in FIG. 6. FIG. 6 is a diagram illustrating FlexE calendar distribution. The order of distribution of twenty blocks at a time is selected over simple "round robin" distribution of 66b blocks to facilitate addition of PHYs 22 to a FlexE group 12 without the need to change the calendar slots allocated to existing FlexE clients 14. Calendar slots are identified by their PHY number and the slot [0-19] (within that PHY). The calendar slots assigned to FlexE clients 14 do not change when PHYs are added or removed from the group 12. PHYs with calendar slots assigned to FlexE clients 14 cannot be removed from the group (or all FlexE clients 14 need to be moved to other PHYs or removed BEFORE a PHY is removed from the group). The "logical" sequence number of a calendar slot is 20× the PHY number plus the calendar slot number within the PHY. The sequence is ascending order. Note that the sequence numbering is not necessarily consecutive when the assigned PHY numbers are not contiguous. This logical order only matters when calendar slots on different PHYs are assigned to the same FlexE client 14.

FlexE Overhead and Alignment

Figure 7:
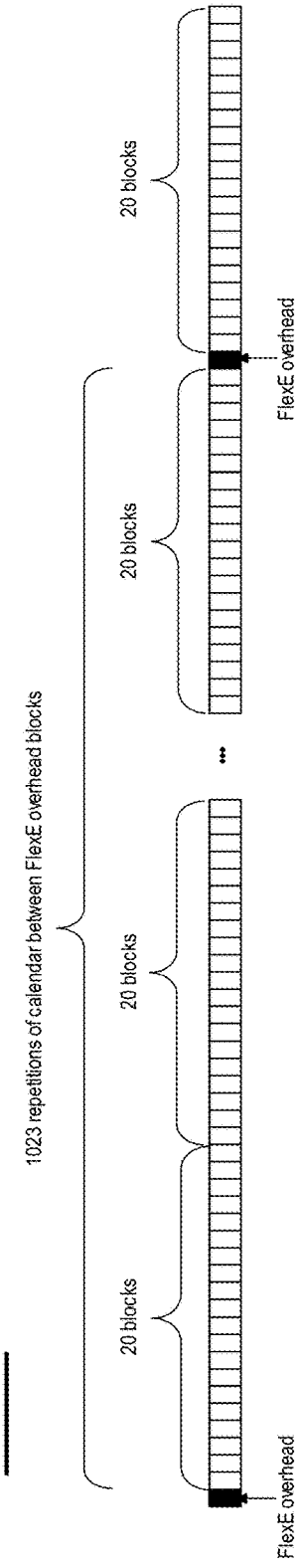
FIG. 7 is a diagram of FlexE overhead on each PHY of the FlexE group.

The alignment of the data from the PHYs 22 of the FlexE group 12 is accomplished by the insertion of FlexE overhead into a stream of 66b blocks carried over the FlexE group 12. The FlexE overhead is encoded as a 66b block which can be recognized independently of the FlexE client data. An illustration of the FlexE overhead on each PHY of the FlexE group is shown in FIG. 7.

On a 100GBASE-R PHY, a FlexE overhead block will occur approximately once per 13.1 μs. The actual format of the FlexE overhead blocks is such that they occur in a repeating sequence of four blocks, so the sequence has a period of approximately 52.4 μs. This sequence is used to align all of the PHYs 22 of the FlexE group 12 at the FlexE demux to reconstruct the sequence in the order of the master calendar so that the FlexE clients 14 can be recovered.

The scenario illustrated in FIG. 5 is supported by marking a certain number of the calendar slots as unavailable. This is different from "unused", in that it is known, due to transport network constraints, that not all of the calendar slots generated from the FlexE mux will reach the FlexE demux and, therefore, no FlexE client 14 should be assigned to those slots. The intention is that when a PHY 22 of the FlexE group 12 is carried across the transport network, the mapping is able to compress the signal to less than the PHY rate by dropping the unavailable calendar slots. A case where 25% of the calendar slots are unavailable is illustrated in FIG. 8.

The anchor position FlexE overhead is encoded as an ordered set (control block type 0x4B). A different "O" code (Operational Code) is selected (i.e. 0x5) which is different from that for the sequence ordered set used by Ethernet or the signal ordered set used by Fibre channel. The information to be transmitted in the FlexE overhead is encoded into the bytes D1, D2, and D3 of the overhead set block is shown in FIG. 9.

The information which needs to be included in the overhead includes:

The number of PHYs 22 in the FlexE group 12;
The identity (sequence) of this PHY 22 within the FlexE group 12;
A way to transmit the programming of the calendars from the FlexE mux to the FlexE demux;
A way to indicate which calendar ("A" or "B") is in use at this time; and
A management channel. This may not be necessary in all applications (for example, if a network management system has direct access to the FlexE shim 15 at both ends of the connection), but may be useful for applications such as using FlexE for an n×100G umbilicus to a remote shelf of lower-rate ports.

Figure 10:
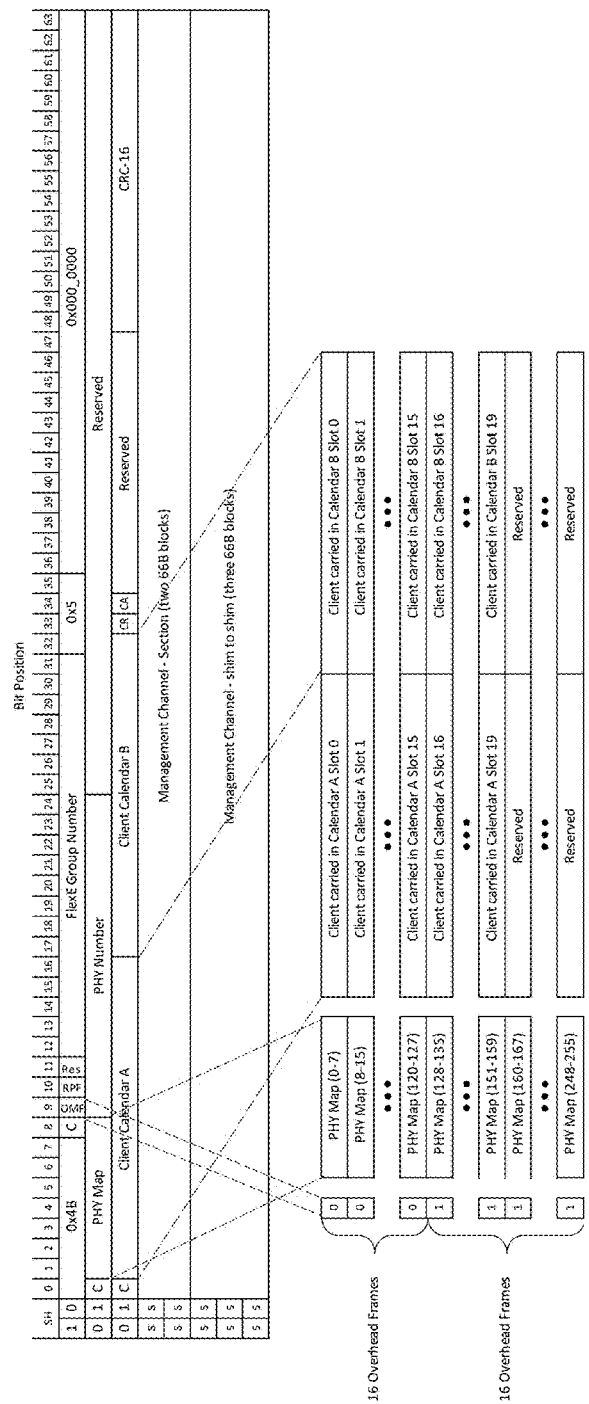
FIG. 10 is a diagram of FlexE overhead.

The amount of information to be conveyed from the FlexE mux to the FlexE demux exceeds the 24 bits available. This is addressed by spreading the relevant overhead across a sequence of four FlexE overhead blocks, each separated by 20×1023 FlexE data blocks. The encoding of the information in the sequence of four FlexE overhead blocks is illustrated in FIG. 10. The meaning, interpretation and processing of this overhead is explained in clause 7 of Contribution Number: oif2015.127.01. The first of each sequence of four FlexE overhead blocks is encoded as an ordered set as shown in FIG. 9. The next three FlexE overhead blocks are encoded as data 66b blocks at known locations based on the position of the ordered set block. The block with the higher order 2 bits of D1=00 serves as a marker to be used for alignment and re-interleaving of the sub-calendars from each of the PHYs 22 of the FlexE group 12 at the FlexE demux. The full sequence repeats once per approximately 52.4 μs. Subject to the amount of buffer provided in a given implementation, skew detection and compensation across the PHYs 22 of the FlexE group 12 can be compensated up to a bit less than half of this amount.

FlexE Group Functions

The FlexE group 12 includes from 1 to n 100GBASE-R PHYs 22. Each 100GBASE-R PHY 22 reuses nearly all of the functions as described for 100GBASE-R in IEEE Std 802.3-2015. This includes a subset of the functions of the PCS as described in clause 82, and all of the functions from sub-layers below the PCS as described in clauses 83, 86, 88, and 91-95 as appropriate according to the PHY type.

The FlexE shim 16 provides to each FlexE group PHY 22 a set of 64b/66b encoded blocks that are encoded according to Figure 82-4 in IEEE Std 802.3-2015. Within the PCS, clause 82, each FlexE group PHY reuses (with reference to Figure 82-2 in IEEE Std 802.3-2015) in the transmit direction, the scrambler, block distribution, and alignment insertion processes. In the receive direction, each FlexE group PHY reuses the lane block sync, alignment lock, and lane deskew (including Bit Error Rate (BER) monitor), lane reorder, alignment removal, and descrambling.

FlexE Clients

The format and standard bit rate of FlexE client 14 are described in clause 6.2 in IEEE Std 802.3-2015. However, FlexE also introduced the concept of flexible non-standard rates such as n×25G (i.e. 175G, 225G, 300G . . . ). FlexE clients 14 generally originate from one of the following sources. A FlexE client 14 may be generated internally within a system, for example from a Network Processing Unit (NPU) within a router or the like. The packet flow is generated at the determined FlexE client 14 MAC rate and 64b/66b encoded according to IEEE Std 802.3-2015 Figure 82-4.

FlexE clients 14 at the rates of 10G, 40G, 100G, and in the future 25G and 400G can be created from an Ethernet PHY 22 at the corresponding rate with some processing to convert to the FlexE client 14 format and rate.

A 10GBASE-R signal will be converted to a 10G FlexE client signal format before presenting to a FlexE mux by using the idle insertion/deletion process as described in IEEE Std 802.3-2015 clause 82.2.3.6 (which will actually be doing idle deletion) to adapt the signal to the 10G FlexE client rate and align start of packet to an 8-byte boundary, encoding according to the 66b block format of Figure 82-4 in IEEE Std 802.3-2015 from the received format which uses the blocks according to Figure 49-7 in IEEE Std 802.3-2015. A 10G FlexE client signal coming from a FlexE demux can be converted to a 10GBASE-R signal format by using the idle insertion/deletion process as described in IEEE Std 802.3-2015 clause 49.2.4.7 (which will actually be doing idle insertion to compensate for the space that had been occupied by FlexE group lane alignment markers and FlexE overhead), which also aligns to 4-byte boundaries, and encodes the blocks according to Figure 49-7 in IEEE Std 802.3-2015.

The 25GBASE-R specification is currently under development in the IEEE P802.3 by project. While the specification has not been finalized, judging from currently adopted baselines, converting a 25GBASE-R signal to a 25G FlexE client signal format is expected to involve correcting FEC errors (if FEC present), removing the FEC, removing the CWM (if present), trans-decoding to 64b/66b, and using the idle insertion/deletion process as described in IEEE Std 802.3-2015 clause 82.2.3.6 (which will actually be doing idle deletion to make room for the FlexE overhead) to adapt the signal to the 25G FlexE client rate and align start of packet to an 8-byte boundary, encoding according to the 66b block format of Figure 82-4 in IEEE Std 802.3-2015 from the received format which uses the blocks according to Figure 49-7 of the same standard. The conversion of a 25G FlexE client signal coming from a FlexE demux to a 25GBASE-R signal is expected to involve using the idle insertion/deletion process as described in IEEE Std 802.3-2015 clause 49.2.4.7 (which will actually be doing idle insertion to compensate for the space that had been occupied by FlexE overhead—the FlexE group lane alignment markers take the same proportion of the space as the CWM), 256b/257b transcoding, insertion of the CWM, and calculation and insertion of FEC, if appropriate.

A 40GBASE-R signal can be converted to a FlexE client 14 by serializing and deskewing the PCS lanes, removing the PCS lane alignment markers, and using the idle insertion/deletion process as described in IEEE Std 802.3-2015 clause 82.2.3.6 (which will actually be doing idle deletion to make room for the FlexE overhead) to adapt the signal to the 40G FlexE client rate. A 40G FlexE client 14 coming from a FlexE demux is converted to a 40GBASE-R interface by using the idle insertion/deletion process as described in IEEE Std 802.3-2015 clause 82.2.3.6 (which in this direction is generally doing idle insertion to restore the nominal bit-rate after removal of FlexE overhead), distributing the blocks round-robin to the four PCS lanes, and inserting PCS lane alignment markers.

A 100GBASE-R signal without FEC can be converted to and from a FlexE client 14 in the same manner as 40GBASE-R described above (except that the number of PCS lanes is 20 rather than 4). A 100GBASE-R signal with FEC, in converting to a FlexE client 14, also will correct any errors per the FEC code, remove the FEC, and trans-decode from 256b/257b prior to the idle insertion/deletion process. To convert a 100G FlexE client 14 coming from a FlexE demux to a 100GBASE-R signal with FEC involves the same processes as for 40GBASE-R, but in addition, transcoding the signal to 256b/257b, inserting the FEC lane alignment markers, and adding the FEC.

400GBASE-R is currently under development in the P802.3bs task force. This standard is not complete, but the process of converting to and from a 400G FlexE client 14 is expected to be similar to that for converting a 100GBASE-R client with FEC to and from a 100G FlexE client 14.

A FlexE client might come from another FlexE shim. In the case of transport network equipment which implements the FlexE shim 16, FlexE clients 14 can be delivered from the FlexE shim 16 at the transport network ingress to another FlexE shim at the transport network egress. The FlexE flow as a sequence of 64b/66b encoded blocks is expected to be carried over the transport network without packet loss. As no timing information is carried by this stream, idle insertion or padding is possible in the mapping over the transport network. The FlexE shim 16 at the network egress will only need to perform idle insertion/deletion according to IEEE Std 802.3-2015 clause 82.2.3.6, not due to any expected change in the nominal bit-rate, but simply to align the clock with that of the other FlexE clients 14 for the same shim.

Interconnect Flexibility

Note that since the format of the FlexE client 14 is simply a logically serial stream of 66b blocks at a given rate, FlexE clients 14 do not need to be produced or received in the same manner at both ends of the connection. For example, a 10G, 25G, or 40G FlexE client 14 might be generated as a system internal signal in the main chassis of a system, connected using an n×100G FlexE umbilicus to a satellite shelf, and connected to physical 10GBASE-R, 25GBASE-R, and 40GBASE-R ports on the satellite shelf. In the case where the FlexE mux is receiving a FlexE client 14 from a physical Ethernet port and the FlexE demux is delivering that FlexE client 14 to a physical Ethernet port, the two ports obviously have to be the same rate, but they do not have to be the same PHY type.

FlexE Overhead

The format of the FlexE overhead is indicated in FIG. 10. The FlexE overhead is encoded as a 66b block and is inserted on each PHY 22 of the FlexE group 12. One overhead block is inserted after every 1023 iterations of the length 20 calendar of FlexE data blocks, so the sequence is one block of overhead followed by 1023×20 blocks of data followed by one block of overhead.

A FlexE overhead lock is achieved at the receiver (FlexE demux) by recognizing the FlexE "O" code used to send the first of every four FlexE overhead blocks, so the sync header is 10, the control block type is 0x4B (ordered set), and the "O" code is 0x5. Once FlexE overhead lock is achieved, the next expected FlexE overhead will be 1023×20+1 block positions later. While in FlexE overhead lock, bytes D1-D3 of the ordered set block, plus the data blocks occurring at 66B block positions 20461, 40922, and 122766 blocks beyond the ordered set block will be interpreted as FlexE overhead multiframe. FlexE overhead is not interpreted if not in FlexE overhead lock. FlexE overhead lock will be lost if the sync header, control block type, or O code do not match at the expected position for 5 occurrences.

Calendar

There are two calendars for each PHY 22 of the FlexE group 12: the "A" calendar (encoded as 0) and the "B" calendar (encoded as one). The two calendars are used to facilitate hitless reconfiguration. Normally, changes are only made to the calendar which is not currently in use. Exceptions would include initial link configuration or replacement of a failed circuit pack where it is necessary to download the calendar information into the replacement pack.

The calendar in use is signaled from the FlexE mux to the FlexE demux in bit position 2 of the first three of the four codewords in the FlexE multiframe sequence. While most of the FlexE overhead can be reliably protected by the Cyclic Redundancy Check (CRC), the calendar in use must be interpreted even if the CRC is bad, since the FlexE demux must switch its calendar in use at precisely the same multiframe boundary as the FlexE mux. So that this can be done reliably, three copies of the calendar in use are transmitted and interpreted by the receiver by majority vote. Since the three copies are separated into different FlexE overhead blocks across the multiframe (1,351,704 bits apart from each other), the different copies will never be affected by the same burst error. Since each PHY should have a BER of $10^{-12}$ or better, the probability of two instances of the calendar in use being wrong is no more than $10^{-24}$, which can safely be ignored.

When the calendar in use changes from a 0 to a 1, or from a 1 to a zero, the calendar used by both the FlexE mux and the FlexE demux will be changed beginning with the first FlexE data block of the next FlexE overhead ordered set block.

The set of PHYs 22 in the FlexE group 12 (not necessarily consecutive) are indicated in the "PHY Map Active" portion of the PHY Map field of the FlexE overhead, distributed over the same group of forty sets of four blocks of FlexE overhead as are used to transmit the contents of the two calendars as described herein. The identity of this PHY 22 in the FlexE group (from 1 to n) is encoded in the D3 byte of the FlexE overhead ordered set block. Note that this is persistent information which does not change frequently. The receiver accepts a value for "This PHY" when seen identically for the second time in frames with a good CRC, and updates to the PHY map bit map are accepted from frames with good CRC. The "PHY Map Request" bits of the PHY map are used for a protocol for the addition and removal of PHYs from the FlexE server group as described herein.

The contents of both the A and B calendar are transmitted continuously from the FlexE mux to the FlexE demux, with one calendar slot being programmed in each multiframe of the FlexE overhead. The PC bit indicates which calendar (0=the "A" calendar and 1=the "B" calendar). All slots of the A calendar are programmed (20 multiframes, one for each slot), followed by all slots of the B calendar (20 multiframes). The PC bit will be equal to 0 for the twenty multiframes for programming of the "A" calendar, and equal to 1 for the twenty multiframes for programming of the "B" calendar. The receiver (FlexE demux) achieves calendar lock when the PC bit changes from 0 to 1 or from 1 to 0 in consecutive multiframes with a good CRC. The receiver loses calendar lock if the expected value of the PC bit is wrong in a multiframe with a good CRC.

The calendar is programmed in the same order as the calendar is in the frame from slots 0 to 19, starting with the first multiframe where PC=0 (or is expected to be zero while in calendar lock) for the A calendar and the first multiframe where PC=1 (or is expected to be 1 while in calendar lock) for the B calendar.

The Client field indicates which of the FlexE clients is mapped into a given calendar slot. The size of a given FlexE client can be calculated based on the number of calendar slots that client is assigned to. The Client is a 16-bit field transmitted in the $2^{nd}$ and $3^{rd}$ octets in the second "row" of the multiframe (the first data block after the ordered set). The value 0x000 indicates a calendar slot which is unused (but available). The value 0xFFFF (all ones) indicates a calendar slot which is unavailable, for the case indicated in FIG. 5 where the full FlexE group PHY rate cannot be carried over the transport network.

Calendar slot assignment changes are ignored while not in Calendar lock. Any change to which client is mapped into a calendar slot is ignored in a frame with a bad CRC. The full contents of both calendars are transmitted from the FlexE mux to the FlexE demux approximately once every 2 ms. The fact that the calendars are transmitted continuously avoids an inconsistency between the calendars at the FlexE mux and the FlexE demux due to a lost message.

The normal process of reconfiguration (e.g., adding new FlexE clients 14 to the FlexE group 12 or resizing a FlexE client 14) will involve programming the new configuration into the calendar which is not in use, then switching to the updated calendar, and finally updating the original calendar. The FlexE mux should wait for at least 3 cycles of transmission of the full calendar after the last update before switching the updated calendar to be the new calendar in use as described in clause 7.3.2 in IEEE Std 802.3-2015. This provides a vanishingly small probability that a calendar update has not been successfully received without requiring an Acknowledgement (ACK).

Management Channel

Certain applications may require the use of a management channel between the FlexE mux and the FlexE demux. The management channel may not be required for an application where a single management system or controller has access to the FlexE shims 16 on both ends of the FlexE group 12, but certain applications such as using FlexE for an n×100G umbilicus to a remote shelf may use the management channel for communication with the controller in the remote shelf for configuration, alarming, software update, etc. When the management channel is not used, it is transmitted as zeros before scrambling The format of the management channel is not specified and is application specific. The management channel occupies 18 bytes of each FlexE overhead multiframe. The total capacity of the management channel is approximately 2.749 Mb/s.

Each PHY 22 of the FlexE group can carry its own management channel. The management channels are not aggregated across the FlexE group to keep open the possibility to pass back remote failure indications, for example, losing one of the PHYs 22 of the FlexE group 12. Most likely protocols that would be carried over this type of channel would be message oriented and would have some sort of frame check sequence on each packet, and therefore not require marking bytes of the management channel as bad if the CRC on the FlexE overhead is bad.

FlexE Group Number

For some applications, it may be desirable to be able to distinguish one FlexE group 12 from another: for example, an 8-port device which is capable of being provisioned as a single 8-port group or two 4-port groups may create a situation where the PHY numbers could overlap between different groups. For such a situation, a 7-bit FlexE group number is provided which allows for checking that the correct PHY 22 is being received from the correct group number. When this field is used, it must be provisioned to the same value in both directions. When a non-zero value is provisioned, the received group number will be checked against the provisioned group number, and any mismatch will be alarmed to indicate the misconnection.

Reserved Bits 18 bits per FlexE overhead multiframe are reserved for possible future extensions to this implementation agreement. The reserved bits shall be transmitted as zero before scrambling. An implementation could choose to treat receipt of non-zero in the reserved bits in a multi-frame with a good CRC as a minor alarm, as it could indicate interconnection with a future version of this implementation agreement that is not known to be interoperable. An implementation could also choose to ignore these bits on receipt and leave the responsibility to an implementation of a newer version of the implementation agreement to recognize receipt of zeros as an indication of interconnection with an older version, and presumably the newer version knows whether it is interoperable with the older version.

CRC-16

Primarily to avoid corrupting the content of the calendars in the presence of bit errors, the FlexE overhead is protected by a CRC. The CRC is calculated over the following bits across the four rows of the FlexE overhead multiframe (in the order transmitted and received, not the order described):

The D1, D2, and D3 bytes of the ordered set overhead block

All eight octets after the sync header of the $2^{nd}$ and $3^{rd}$ overhead data blocks The first six octets after the sync header of the $4^{th}$ overhead data block.

The CRC is calculated using the polynomial $x^{16}+x^{12}+x^5+1$. This value is inserted by the FlexE mux into the transmitted overhead. It is calculated by the FlexE demux over the same set of bits and compared to the received value. Various overhead described in the previous clauses is either accepted or ignored based on whether the CRC matches the expected value.

FlexE Mux Data Flow

The FlexE Mux creates a logically serial stream of 66b blocks by interleaving FlexE client signals, according to a master calendar of length 20n slots for a FlexE group including n 100GBASE-R PHYs. Each slot corresponds to 5G of bandwidth. A FlexE client is assigned a number of slots according to its bandwidth divided by 5G. The master calendar is distributed as described earlier in FIG. 6.

Figure 11:
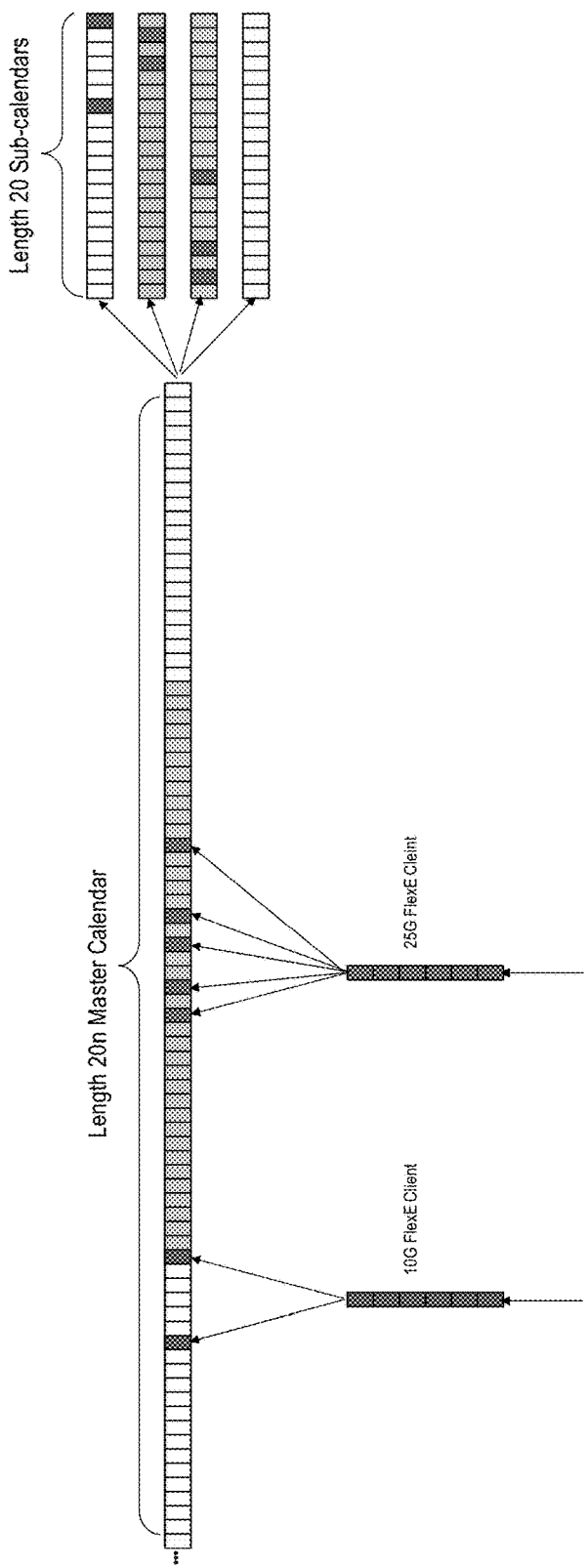
FIG. 11 is a diagram of data flow and interleaving for a FlexE client mux in calendar slots.

FIG. 11 presents an example of insertion of different bandwidth FlexE clients 14 into a logical master calendar. The slots assigned to a particular FlexE client 14 do not all need to be on the same PHY 22 of the FlexE group 12, and new clients 14 can be added as long as there are sufficient slots available. Any slot in the master calendar which is either "unassigned" or "unavailable" will be filled with Ethernet Error control blocks with the format given in FIG. 12. This ensures that any error in calendar slot assignment cannot appear to the FlexE demux as valid FlexE client data. Any incoming FlexE client 14 which has failed (e.g., one created from a physical Ethernet signal where the signal has failed, or failure to achieve block lock) will cause the slots assigned to that FlexE client 14 to be filled with Ethernet Local Fault ordered sets with the format as given in FIG. 13.

These rules allow for the creation of the complete data sequence on each PHY 22 of the FlexE group 12. The FlexE overhead is inserted onto each FlexE group PHY after every 1023 repetitions of the calendar sequence in the same relative position to the calendar sequence on every PHY 22. This provides a marker which allows the data from the different PHYs 22 of the FlexE group 12 to be re-interleaved in the original sequence so that the FlexE clients 14 can be extracted. The 66b block stream is then converted into the format for the individual FlexE group PHY, which includes block distribution and alignment marker insertion, along with (if applicable) 256b/257b transcoding and FEC calculation and insertion.

FlexE Demux Data Flow

Figure 14:
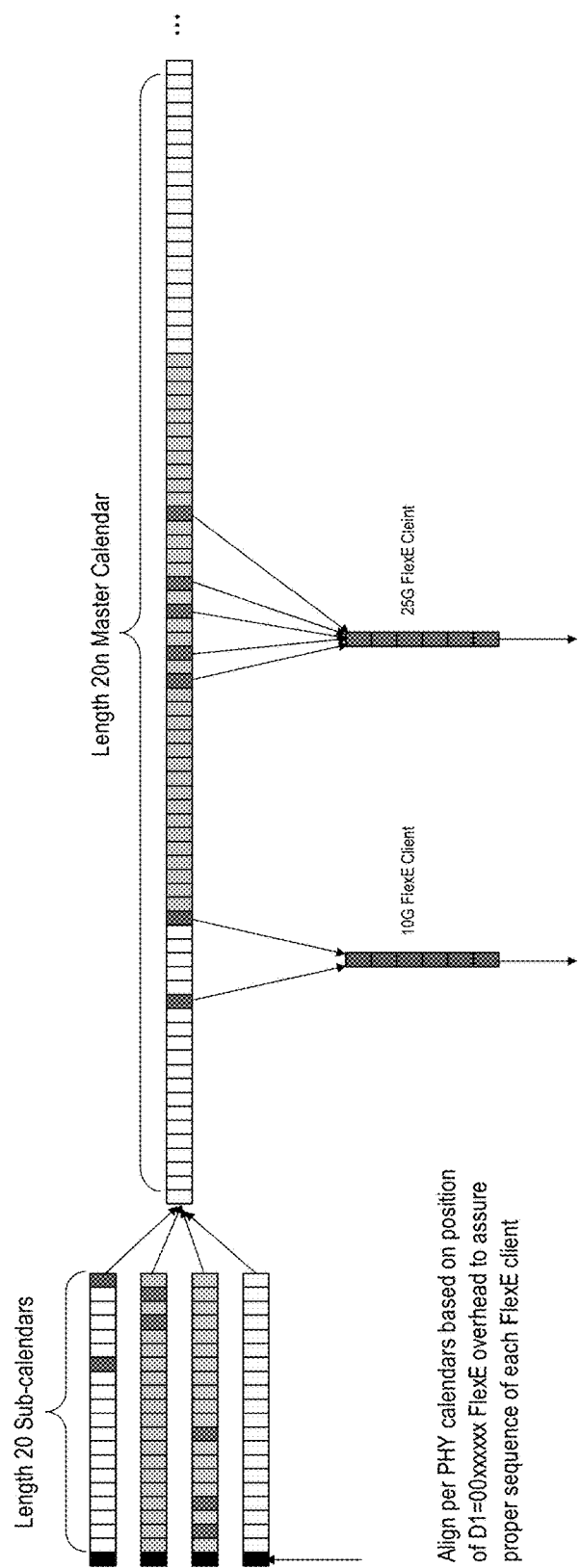
FIG. 14 is a diagram of data flow and de-interleaving for a FlexE client demux in calendar slots.

The FlexE Demux operates on a sequence of 66b blocks received from each PHY 22 of the FlexE group 12. Recovering this sequence of blocks includes (if applicable), FEC error correction and FEC remove and trans-decoding to 64b/66b, PCS or FEC lane alignment, reinterleaving, and alignment marker removal. Once this has occurred, the PHYs 22 of the FlexE group 12 are re-interleaved so that FlexE clients 14 can be recovered as illustrated in FIG. 14. Note that the FlexE overhead multiframe repeats on a cycle of approximately 52.4 µs, which allows measuring skew differences between PHYs 22 of the FlexE group 12 of approximately ±25 µs.

Skew Tolerance Requirements

The amount of skew to be expected between the PHYs 22 of the FlexE group 12 are application specific. Skew requirements are specified for two classes of applications—low skew and high skew applications. Low Skew Applications include intra-data-center applications, plus those transport network applications where the FlexE shim 16 is implemented in the transport equipment, and the FlexE clients 14 rather than the PHYs 22 of the FlexE group 12 are carried across the transport network. The skew tolerance requirement for low skew applications is 300 ns. Note that the intra-PCS-lane skew tolerance requirement for 100GBASE-R is 49 ns. A larger skew budget is established for FlexE applications of similar reach to account for the fact that the PCS lane deskew is not synchronized across the PHYs 22 of the FlexE group 12, and there may be other variation, such as cable length, or even heterogeneous 100GBASE-R PHY types which are not present in a single 100GBASE-R interface.

High Skew Applications include transport network applications where the PHYs 22 of the FlexE group 12 rather than the FlexE clients 14 are carried over the transport network (FlexE unaware transport). The skew tolerance requirement for high skew applications is 10 µs. This is established to account for about 6 µs of dispersion-related skew if the PHYs are mapped over lambdas at opposite ends of the "C" band over large distances (e.g., trans-pacific), with extra margin for things like split-band amplifiers and patch cords or the processing time to crunch and uncrunch the signal in the case where not all of the calendar slots can be carried over the transport network connection.

If the intra-PHY skew exceeds the skew tolerance, the FlexE clients 14 will not be demapped from the incoming PHYs 22, but will be sent continuous Ethernet Local Fault Ordered sets as illustrated in FIG. 13 at the FlexE client rate. If one or more of the PHYs 22 of the FlexE group 12 has failed (e.g., loss of signal, failure to achieve block lock or alignment lock, high BER, or any other condition that results in PCS_Status=FALSE), the FlexE clients 14 will be sent continuous Ethernet Local Fault Ordered sets as illustrated in FIG. 13 at the FlexE client rate. In addition, when one or more of the PHYs 22 of the FlexE group 12 have failed continuous remote fault ordered sets will be sent back over the FlexE group 12 in the calendar slots assigned to any FlexE clients 14, and the RF bit will be set in the FlexE overhead of every PHY in the FlexE group toward the far-end shim.

Addition and Removal of PHYs from a FlexE Group

In general, only one PHY 22 should be added to or removed from a FlexE group 12 at a time. An added PHY 22 begins with all of its calendar slots (except those provisioned as unavailable) as unused. Prior to removing a PHY 22, all clients must be removed from all of its calendar slots in both the "A" and the "B" calendar, i.e., all calendar slots which are not provisioned as "unavailable" will be "unused". Addition and removal of PHYs does not change the (PHY,slot) identifier for any calendar slot on any other PHY, and does not change the order of calendar slots assigned to any currently provisioned FlexE client 14.

Addition and removal of PHYs are controlled by the "PHY map active" and "PHY map request" fields of the FlexE overhead. Changes to either of these fields are only accepted from overhead multiframes with a good CRC. These fields are sent identically on every current PHY of the FlexE group. The receiver may choose to receive these fields from multiple PHYs (so if a CRC is bad on one PHY, it receives it from another), or may choose to receive the overhead from only one PHY and rely on the fact that the overhead is repeated in a continuous cycle to receive eventually updates through repetition.

Whether the PHY addition procedure to add a new PHY to the group is initiated from one or both ends is application dependent. The new PHY might be added at both ends by the management or control system, or one end might be the master and the other the slave, with the slave echoing back the PHY addition request initiated by the master. The initiation procedure begins by changing the bit position in the "PHY map request field" from a zero to a one, bringing up the new PHY, and transmitting the FlexE overhead on the PHY to be added.

The PHY is considered added once the following conditions are met:

The far end has also changed the bit position for the PHY to be added from zero to one in the "PHY map request" field.

PCS_status=TRUE for the PHY to be added (no Loss of Signal (LOS), block lock and AM lock have been achieved on every PCS lane, no hi_ber).

FlexE overhead lock and calendar lock are achieved on the added PHY, the expected value is being received in the "This PHY" field, and the FlexE overhead being received is within the skew tolerance with the rest of the FlexE group.

Once these conditions are met, the bit position corresponding to the added PHY is changed from a zero to a one in the "PHY map active" field. FlexE clients 14 may not be assigned to the newly added PHY until both the near end and the far end are indicating a one in the "PHY map active" field for the new PHY.

For PHY removal, all FlexE clients 14 must be removed from the A and the B calendars on a PHY before it can be removed. Any calendar slot not provisioned as "unavailable" must be "unused" in both calendars on the PHY. Whether the initiation procedure occurs from one or both ends is implementation dependent—both ends could be configured, or the controller at the far end could echo back the near end request in a master/slave configuration. The procedure begins by changing the PHY Map Request bit corresponding to the PHY to be deleted from a one to a zero. After the near end has changed the PHY Map Request bit to a zero, when the far end also has changed its PHY Map Request bit to a zero, the near end changes its PHY Map Active bit to a zero. The PHY is considered deleted once a zero is being received in the PHY Map Active bit from the far end. The FlexE overhead continues to be sent on the PHY being deleted until the far end is indicating zero in its PHY Map Active bit corresponding to the PHY.

FlexE Management

For FlexE group management, the control variables are the number of PHYs 22 in the FlexE group. The status variables are PHY_align—True if all PHYs in the FlexE group are being received and are within the skew tolerance of the implementation. False if one or more of the incoming PHYs has failed or if the inter-PHY skew exceeds the skew tolerance of the implementation.

For FlexE group management, per PHY, note that all 100GBASE-R control and status variables in or below the PCS are applicable to each PHY of the FlexE group 12.

Control Variables:
PHY number (within the FlexE Group)
Number of available Calendar Slots (20 except when entire PHY can't be carried across the transport network)
Mux_Calendar_A[0 . . . 19] and Mux_Calendar_B[0 . . . 19] The FlexE client that is mapped into each of the respective calendar slots in the transmit direction. The initial default for all calendar slots is UNUSED, except in the case where the number of available calendar slots is less than 20, in which case the first AVAILABLE number of slots default to UNUSED and the rest default to UNAVAILABLE.
Tx_Calander_in_use—Indicates whether the A or the B calendar is currently active.

Status Variables
Demux_Calendar_A[0 . . . 19] and Demux_Calendar_B[0 . . . 19] The FlexE client that the far end has mapped into each of the calendar slots in the received direction. The initial default for all calendar slots (prior to information received from the far end) is UNUSED, except in the case where the number of available calendar slots is less than 20, in which case the first AVAILABLE number of slots default to UNUSED and the rest default to UNAVAILABLE.
Rx_Calendar_in_use—Indicates the calendar being used at the current time by the far end.

Transport Network Mappings for Flex Ethernet Signals

Three different methods of mapping of FlexE signals over transport networks are possible. The case of FlexE unaware transport involves the transport network mapping each of the Ethernet PHYs independently over the transport network using a PCS codeword transparent mapping. Since the FlexE mux and FlexE demux are separated by transport network distances, this requires a "high skew" implementation of the FlexE shim 16.

Note that certain existing OTN mappers/demappers are not fully PCS codeword transparent with respect to LF and RF ordered sets, and may mistake an LF or RF sent for an individual FlexE client as an LF or RF for the entire link and bring the link down. This is not an issue in the case of FlexE unaware transport of simple bonding to carry a larger rate flow, as a failure of the single high-rate FlexE client is equivalent to a failure of the group. But it may be an issue if FlexE unaware transport is used to carry a group of multiple lower-rate FlexE client services using less than fully PCS codeword transparent mappings.

The next case is where the FlexE shim 16 is implemented in the transport network equipment, and rather than carrying the PHYs 22 of the FlexE group 12 over the transport network, the FlexE clients 14 are carried over the transport network. The 64b/66b encoded FlexE client rate is:

$$\text{FlexE Client } MAC \text{ rate} \times \frac{66}{64} \times \frac{16383}{16384} \times \frac{20460}{20461} \pm 100 \text{ ppm}$$

Note that while this is the stream of blocks presented to the transport network from the FlexE shim 16 to be carried, since this stream does not have any timing information, the transport network is not required to signal at this rate: idle insertion/deletion or padding may be used in the mapping specified by ITU-T if it provides a more convenient rate for the transport.

When a FlexE client 14 is mapped in this manner, it may be connected at the OTN egress to another FlexE shim 16 where it will be clock aligned with other FlexE clients 14 carried over the same FlexE group 12. It may also be connected to an Ethernet PHY 22 with the same nominal MAC rate as the FlexE client 14 using the appropriate conversion as described herein.

Note that in the case where it is necessary to connect a FlexE client 14 to an Ethernet PHY 22 across an OTN where the Ethernet PHY 22 uses a legacy mapper/demapper, it may be necessary to perform the conversion of the FlexE client 14 to the Ethernet PHY format according to clause 7.2.2 immediately after the FlexE shim 16 and to map the FlexE client 14 over OTN as if it were an Ethernet PHY 22 of the corresponding rate. This second case can use a "low skew" implementation of the FlexE shim 16 as described herein.

The third case is where the FlexE shim 16 is not terminated in the transport network equipment, but the transport network equipment "crunches" the PHY 22 of the FlexE group 12 by discarding unavailable calendar slots at the transport network ingress and re-inserting them at the transport network egress. The mapping of this requires serializing and deskewing the PCS lanes of the PHY, then discarding all "UNAVAILABLE" calendar slots from the structure to reduce the bit-rate. For example, if only 15 of 20 calendar slots are available, there are effectively 1023 repetitions of a length 15 calendar after discarding the unavailable slots. At the transport network egress, the unavailable slots are restored to the FlexE PHY stream of 66b blocks (inserting error control blocks as illustrated in FIG. 12. The net bit-rate of this reduced-rate flow when there are "n" available calendar slots is:

$$103.125 \text{ Gb/s} \times \frac{16383}{16384} \times \frac{1 + 1023n}{20461} \pm 100 \text{ ppm}$$

AES Encryption

AES is a specification for the encryption of electronic data established by the U.S. National Institute of Standards and Technology (NIST). AES is based on the Rijndael cipher which is a family of ciphers with different key and block sizes. For AES, NIST selected three members of the Rijndael family, each with a block size of 128 bits, but three different key lengths: 128, 192 and 256 bits. AES is a symmetric-key algorithm, meaning the same key is used for both encrypting and decrypting the data. AES is based on a design principle known as a substitution-permutation network, combination of both substitution and permutation, and is fast in both software and hardware. Unlike its predecessor DES, AES does not use a Feistel network. AES operates on a 4×4 column-major order matrix of bytes, termed the state, although some versions of Rijndael have a larger block size and have additional columns in the state. Most AES calculations are done in a special finite field.

GCM Encryption

Galois/Counter Mode (GCM) is a mode of operation for symmetric key cryptographic block ciphers that has been widely adopted because of its efficiency and performance. GCM throughput rates for state of the art, high speed communication channels can be achieved with reasonable hardware resources. The operation is an authenticated encryption algorithm designed to provide both data authenticity (integrity) and confidentiality. GCM is defined for block ciphers with a block size of 128 bits. Galois Message Authentication Code (GMAC) is an authentication-only variant of the GCM which can be used as an incremental message authentication code. Both GCM and GMAC can accept initialization vectors of arbitrary length. Different block cipher modes of operation can have significantly different performance and efficiency characteristics, even when used with the same block cipher. GCM can take full advantage of parallel processing and implementing GCM can make efficient use of an instruction pipeline or a hardware pipeline. In contrast, the cipher block chaining (CBC) mode of operation incurs significant pipeline stalls that hamper its efficiency and performance.

FlexE Encryption

Figure 15:
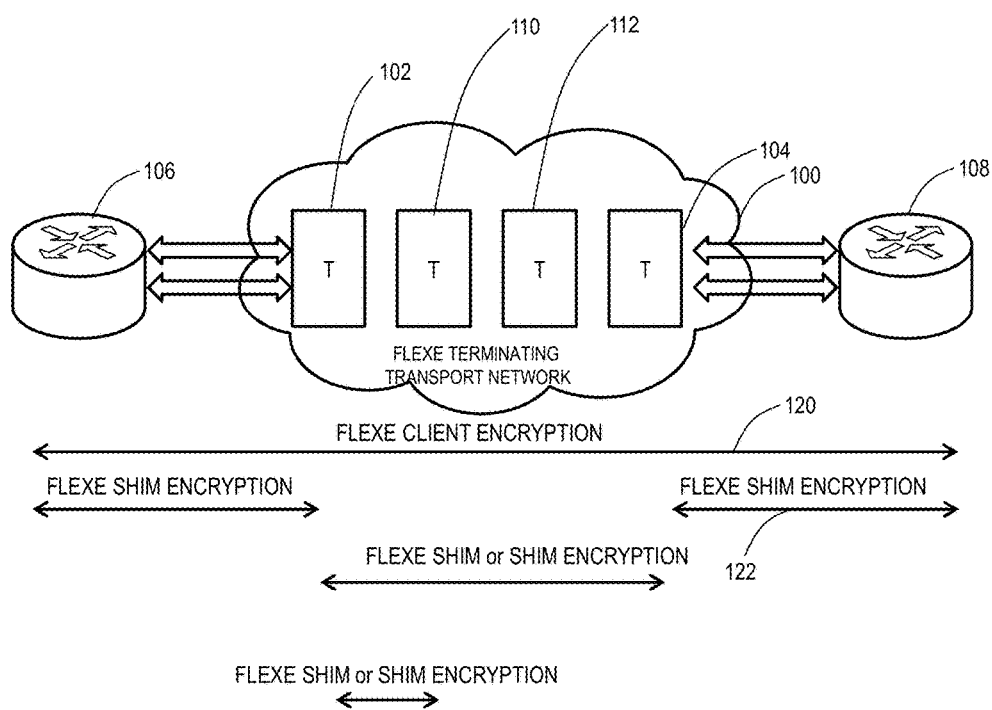
FIG. 15 is a network diagram of a transport network with elements coupled to switches/routers with FlexE encryption.

Referring to FIG. 15, in an exemplary embodiment, a network diagram illustrates a FlexE terminating transport network 100 with network elements 102, 104 coupled to switches/routers 106, 108 and with intermediate, transparent network elements 110, 112 between the network elements 102, 104, with FlexE encryption. In an exemplary embodiment, a FlexE client can be transported as a service (or private line service) in a provider network (i.e., the transport network 100). The switches/routers 106, 108 can be referred to as subscriber equipment where a service originates or terminates, i.e., a maintenance entity. The transport network 100 can include a plurality of network elements in addition to the network elements 102, 104. The various network elements in the transport network 100 are configured to perform transport/switching. In FlexE, the transport/switching can be ODUk/flex and/or FlexE client based switching. An example of FlexE client based switching is described in U.S. patent application Ser. No. 14/855,857, filed on Sep. 16, 2015, and entitled "FLEXIBLE ETHERNET SWITCHING SYSTEMS AND METHODS," the contents of which are incorporated by reference.

The transport network 100 can include FlexE client encryption 120, covering the entire path, and/or FlexE shim encryption 122, covering the section between the router to transport segment. Further, FlexE client encryption can cover the path from on-ramp transport node to off-ramp transport node. Additionally, FlexE shim encryption can also cover the segments between transport nodes as well as cover the path layer between on-ramp and off-ramp transport nodes. In either of the encryption methods 120, 122, FlexE encryption is applied at Layer 1, does not affect the packet rate and can be used with future FlexE interfaces, without requiring need for OTN wrapping. The encryptions 120, 122 are also lower complexity, resulting in lower logic, lower power and lower cost for the overall solution. The FlexE client encryption 120 is applied at the FlexE client (i.e., path layer) between the switches/routers 106, 108 and across the transport network 100. The FlexE shim encryption 122 is applied at the FlexE shim (i.e., section/segment) between the switch/router 106 and the network element 102 and between the switch/router 108 and the network element 104. The FlexE shim encryption can be applied at the FlexE shim between the on-ramp network element (102, 104) and the off-ramp network element (104, 102). The FlexE shim encryption can be applied at the FlexE shim between individual transport network elements 102, 104, 110, 112. The FlexE client encryption can be applied at the FlexE client between the on-ramp network element 102, 104 and the off-ramp network element 104, 102. The FlexE client encryption can be applied at the FlexE client between individual transport network elements 102, 104, 110, 112.

Figure 16:
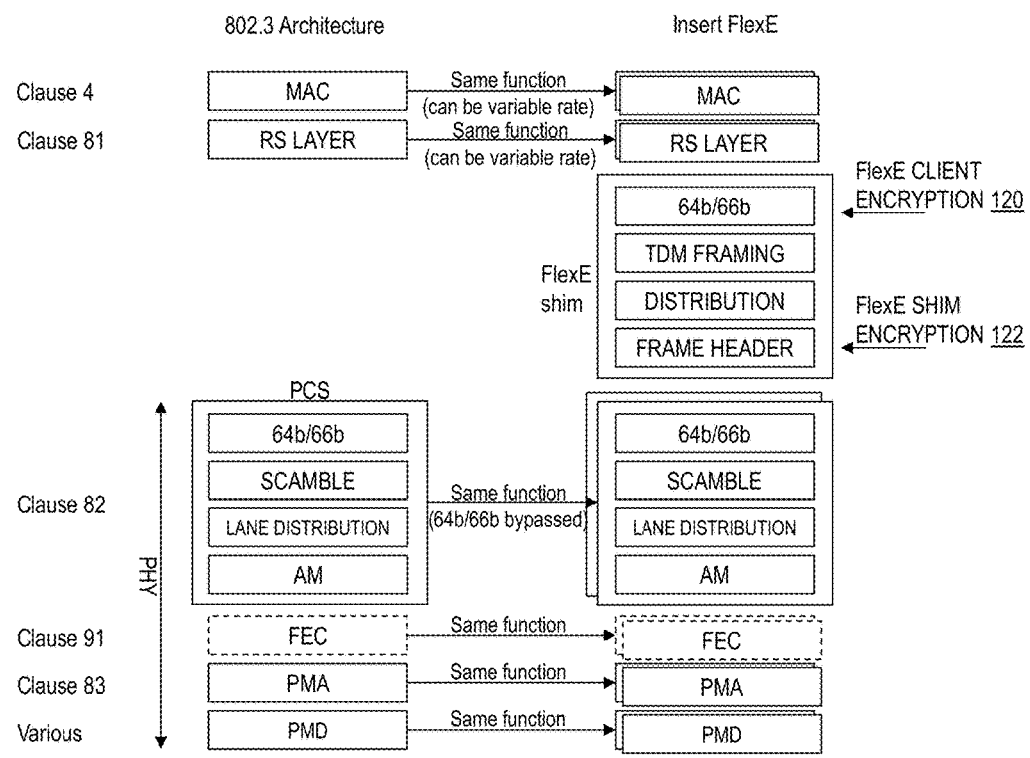
FIG. 16 is a logical diagram of the IEEE 802.3 stack compared to a FlexE stack and possible locations for encryption.

Referring to FIG. 16, in an exemplary embodiment, a logical diagram illustrates the IEEE 802.3 stack compared to a FlexE stack. Specifically, the logical diagram compares functions such as MAC, RS, PCS, FEC, PMA, and PMD. As described herein, the FlexE shim can reside between the RS layer and the PMD. For the FlexE shim encryption 122, encryption is provided at the FlexE shim, i.e., on the whole shim. 64b/66b bit streams for all FlexE clients are mapped into the FlexE shim and the FlexE shim encryption 122 can be applied across the entire shim, i.e., all of the FlexE clients. The FlexE shim encryption 122 does not benefit to FlexE client switching as it is applied hop by hop, but it is less complex (than the FlexE client encryption 120) and can be applied without knowledge of the client mappings (i.e., in the transport equipment or the PHYs). As shown in the logical diagram of FIG. 16, the FlexE shim encryption 122 can be applied at the bottom of the FlexE shim layer. The FlexE shim encryption 122 can reuse portions of the FlexE frame overhead for key exchange, authentication, GCM tags, etc. In an exemplary embodiment, an encryption messaging channel for key exchange, authentication, GCM tags, etc. can utilize reserved and/or undefined locations in the FlexE frame/shim overhead. Also, the encryption messaging channel can be performed through the FlexE management channel, shown in FIG. 10.

Figure 17:
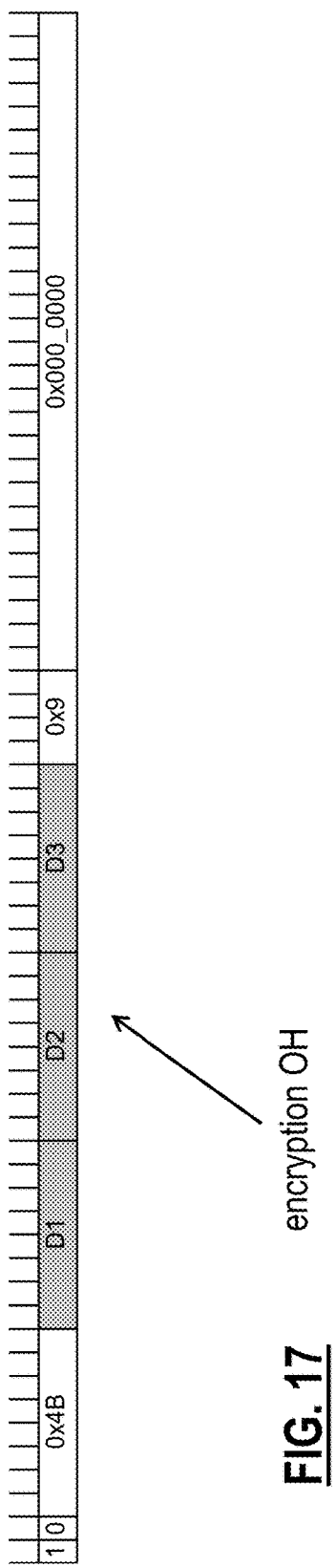
FIG. 17 is a diagram of encoding of ordered set block for FlexE overhead similar to FIG. 9 for an encryption messaging channel.

The FlexE client encryption 120 can be applied on individual clients, and can be performed at a top of the FlexE shim as shown in the logical diagram of FIG. 16. The FlexE client encryption 120 benefits FlexE client switching, and can be mapped into the FlexE shim or can be a standard client going to standard PCS/PHY. Also, the FlexE client encryption 120 can be utilized with the FlexE shim encryption 122. For communications, the FlexE client encryption 120 can utilize a portion of the FlexE client stream (e.g., 1/16k) with a special O code (e.g., 0x9) with 24-bit data fields for an encryption messaging channel. For example, FIG. 17 is a diagram of encoding of ordered set block for FlexE overhead similar to FIG. 9 for the encryption messaging channel.

Referring to FIG. 18, in an exemplary embodiment, a table illustrates 64b/66b block formats. For the client encryption 120 at 64b/66b, the client encryption 120 does not encrypt the 64b/66b header (2-bits) as this still needs to go through standard Ethernet PHYs and is used for alignment. For the client encryption 120, 01 data blocks (Dx fields) can be all encrypted and 10 control block need special attention. In an exemplary embodiment, only data blocks are encrypted which allows idles and rate adjustments, allows for LF/RF, and easily maps into ODUflex (IMP). In another exemplary embodiment, data and some control blocks are encrypted to minimize the visibility of the Start of Packet (SOP)/End of Packet (EOP) (link chatter).

GCM can be used in combination with AES to provide authentication of the encrypted message by adding a tag (hash). As per NIST Special Publication 800-38D, November 2007, "Recommendation for Block Cipher Modes of Operation: Galois/Counter Mode (GCM) and GMAC," the contents of which are incorporated by reference herein, up to 64 GB of data can be covered with a single tag of 96, 104, 112, 120, or 128 bits. There is less than 50 ppm to add the GCM tag. As much of that as possible can be used to minimize latency and buffer requirements. The GCM tag is either in the shim layer encryption messaging channel (for the FlexE shim encryption 122) or directly in-band with the 0x9 O-code message channel when encrypting the client directly (for the FlexE client encryption 120).

Figure 19:
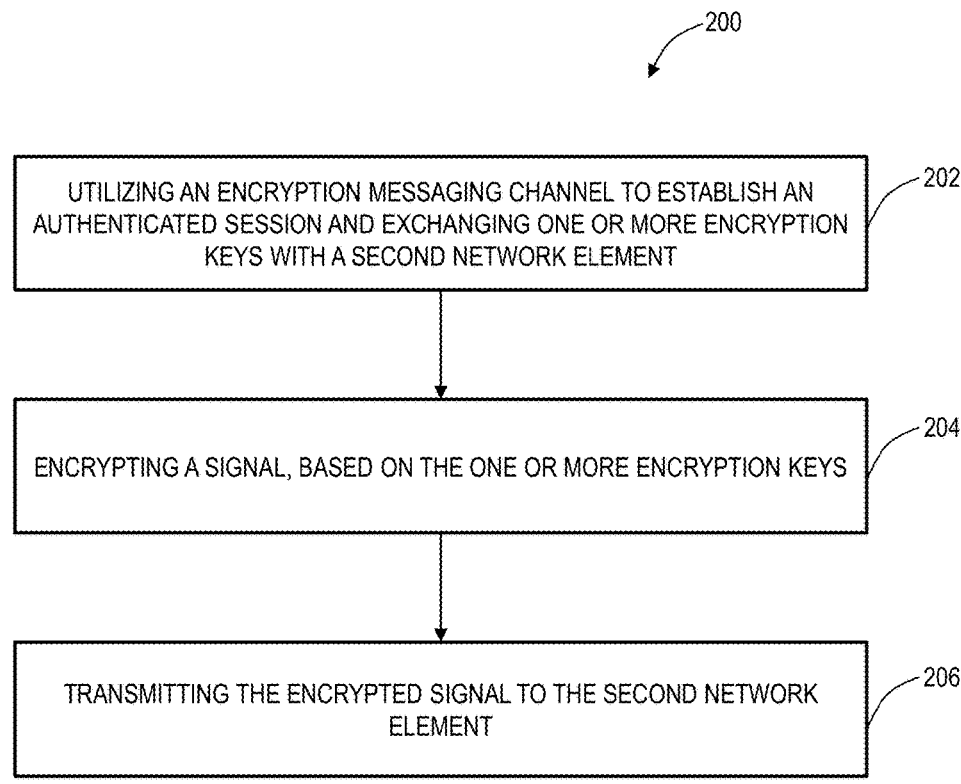
FIG. 19 is a flowchart of a process for Physical Coding Sublayer (PCS) encryption implemented by a first network element communicatively coupled to a second network element.

Referring to FIG. 19, in an exemplary embodiment, a flowchart illustrates a process 200 for Physical Coding Sublayer (PCS) encryption implemented by a first network element communicatively coupled to a second network element. The process 200 includes utilizing an encryption messaging channel to establish an authenticated session and exchanging one or more encryption keys with a second network element (step 202); encrypting a signal, based on the one or more encryption keys (step 204); and transmitting the encrypted signal to the second network element (step 206). The encryption can be applied to a 64b/66b bit stream associated with a FlexE signal at one or more of a FlexE client layer and a FlexE shim layer. The encryption messaging channel can be utilized for key exchange, authentication, and tags with the second network element. The signal can include a FlexE shim including a plurality of FlexE clients. The signal can include one of a FlexE client and a generic Ethernet PCS stream onto standard Ethernet PHY. The encryption messaging channel can utilize one or more of reserved bytes in FlexE overhead and a management channel. The encryption messaging channel can utilize a FlexE client or PCS stream with a designed Operational code. The encryption can be applied to a 64b/66b bit stream with data blocks encrypted as well as some control blocks encrypted. The encryption can utilize one or more of Advanced Encryption Standard (AES) and Galois/Counter Mode (GCM).

In another exemplary embodiment. an apparatus for Physical Coding Sublayer (PCS) encryption implemented at a first network element communicatively coupled to a second network element includes circuitry adapted to utilize an encryption messaging channel to establish an authenticated session and exchanging encryption keys with a second network element; circuitry adapted to apply encryption to a signal, based on the encryption key; and circuitry adapted to transmit the signal with the encryption to the second network element. In a further exemplary embodiment, a network with Flexible Ethernet (FlexE) encryption includes a first network element; and a second network element communicatively coupled to the first network element; wherein the first network element is adapted to utilize an encryption messaging channel to establish an authenticated session and exchanging encryption keys with a second network element, apply encryption to a signal, based on the encryption key, and transmit the FlexE signal with the encryption to the second network element. The encryption can be applied to a 64b/66b bit stream associated with the FlexE signal at one or more of a FlexE client layer, a FlexE shim layer, and a generic Ethernet PCS stream onto standard Ethernet PHY.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for Physical Coding Sublayer (PCS) encryption implemented by a first network element communicatively coupled to a second network element, the method comprising:
   utilizing an encryption messaging channel in Flexible Ethernet (FlexE) overhead of a FlexE signal to establish an authenticated session and to establish one or more encryption keys with a second network element;
   encrypting a signal, based on the one or more encryption keys, wherein the encryption is applied to a 64b/66b bit stream associated with the FlexE signal at one or more of a FlexE client layer and a FlexE shim layer; and
   transmitting the encrypted signal to the second network element.

2. The method of claim 1, wherein the encryption messaging channel is utilized for key exchange, authentication, and tags with the second network element.

3. The method of claim 1, wherein the signal comprises a FlexE shim comprising a plurality of FlexE clients.

4. The method of claim 1, wherein the signal comprises one of a FlexE client and a generic Ethernet PCS stream onto standard Ethernet PHY.

5. The method of claim 1, wherein the encryption messaging channel utilizes one or more of reserved bytes in the FlexE overhead and a management channel.

6. The method of claim 1, wherein the encryption messaging channel utilizes a FlexE client or PCS stream with a designed Operational code.

7. The method of claim 1, wherein the encryption is applied to a 64b/66b bit stream with one of (i) only data blocks encrypted and (ii) data blocks encrypted along with one or more control blocks comprising a start of packet and an end of packet.

8. The method of claim 1, wherein the encryption utilizes one or more of Advanced Encryption Standard (AES) and Galois/Counter Mode (GCM).

9. An apparatus for Physical Coding Sublayer (PCS) encryption implemented at a first network element communicatively coupled to a second network element, the apparatus comprising:
   circuitry adapted to utilize an encryption messaging channel in Flexible Ethernet (FlexE) overhead of a FlexE signal to establish an authenticated session and to establish one or more encryption keys with a second network element;
   circuitry adapted to encrypt a signal, based on the one or more encryption keys, wherein the encryption is applied to a 64b/66b bit stream associated with the FlexE signal at one or more of a FlexE client layer and a FlexE shim layer; and
   circuitry adapted to transmit the encrypted signal to the second network element.

10. The apparatus of claim 9, wherein the encryption messaging channel is utilized for key exchange, authentication, and tags with the second network element.

11. The apparatus of claim 9, wherein the signal comprises a FlexE shim comprising a plurality of FlexE clients.

12. The apparatus of claim 9, wherein the signal comprises one of a FlexE client and a generic Ethernet PCS stream onto standard Ethernet PHY.

13. The apparatus of claim 9, wherein the encryption messaging channel utilizes one or more of reserved bytes in the FlexE overhead and a management channel.

14. The apparatus of claim 9, wherein the encryption messaging channel utilizes a FlexE client or PCS stream with a designed Operational code.

15. The method of claim 1, wherein the encryption is applied to a 64b/66b bit stream with one of (i) only data blocks encrypted and (ii) data blocks encrypted along with one or more control blocks comprising a start of packet and an end of packet.

16. The apparatus of claim 9, wherein the encryption utilizes one or more of Advanced Encryption Standard (AES) and Galois/Counter Mode (GCM).

17. A network with Flexible Ethernet (FlexE) encryption, the network comprising:
   a first network element; and
   a second network element communicatively coupled to the first network element;
   wherein the first network element is adapted to
      utilize an encryption messaging channel in Flexible Ethernet (FlexE) overhead of a FlexE signal to establish an authenticated session and to establish one or more encryption keys with a second network element,
      encrypt the FlexE signal, based on the one or more encryption keys, and
      transmit the encrypted signal to the second network element,
   wherein the encryption is applied to a 64b/66b bit stream associated with the FlexE signal at one or more of a FlexE client layer, a FlexE shim layer, and a generic Ethernet PCS stream onto standard Ethernet PHY.

\* \* \* \* \*